(12) United States Patent
Ushio et al.

(10) Patent No.: US 11,134,192 B2
(45) Date of Patent: Sep. 28, 2021

(54) OPTICAL SYSTEM AND IMAGE PROJECTION APPARATUS INCLUDING AN INTERFACE THAT TRANSMITS OR REFLECTS LIGHT

(71) Applicants: Kohei Ushio, Kanagawa (JP); Takashi Kubota, Tokyo (JP)

(72) Inventors: Kohei Ushio, Kanagawa (JP); Takashi Kubota, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/574,101

(22) Filed: Sep. 18, 2019

(65) Prior Publication Data

US 2020/0137303 A1 Apr. 30, 2020

(30) Foreign Application Priority Data

Oct. 31, 2018 (JP) .............................. JP2018-205180
Jul. 18, 2019 (JP) .............................. JP2019-132802

(51) Int. Cl.
*H04N 7/18* (2006.01)
*H04N 5/232* (2006.01)
(Continued)

(52) U.S. Cl.
CPC ......... *H04N 5/23238* (2013.01); *G02B 7/006* (2013.01); *G03B 17/17* (2013.01);
(Continued)

(58) Field of Classification Search
CPC .. H04N 5/23238; H04N 9/3194; G02B 7/006; G03B 17/17; G03B 21/28; G03B 37/04
See application file for complete search history.

(56) References Cited

U.S. PATENT DOCUMENTS 5,552,922 A  9/1996 Magarill
5,886,824 A * 3/1999 Takahashi .......... G02B 17/0816
                                                    359/631

(Continued)

FOREIGN PATENT DOCUMENTS

CN      1295259 A    5/2001
CN    105793744 A    7/2016

(Continued)

OTHER PUBLICATIONS

Extended European Search Report dated Apr. 1, 2020, issued in corresponding European Patent Application No. 19196245.5, 10 pages.

(Continued)

*Primary Examiner* — Leron Beck
(74) *Attorney, Agent, or Firm* — Xsensus LLP

(57) ABSTRACT

An optical system includes an optical element configured to emit light emitted from a light source; and an optical modulation element configured to receive the light emitted from the optical element and emit first light rays in a first direction and second light rays in a second direction different from the first direction. The optical element has an interface that transmits one and reflects the other of: the first light rays to be directed to a projection target; and the second light rays and the light emitted from the light source.

15 Claims, 22 Drawing Sheets

(51) Int. Cl.
*G02B 7/00* (2021.01)
*G03B 17/17* (2021.01)
*G03B 21/28* (2006.01)
*G03B 37/04* (2021.01)
*H04N 9/31* (2006.01)

(52) U.S. Cl.
CPC ............. *G03B 21/28* (2013.01); *G03B 37/04* (2013.01); *H04N 9/3194* (2013.01)

(56) References Cited

U.S. PATENT DOCUMENTS

| | | | | |
|---|---|---|---|---|
| 6,454,417 | B1* | 9/2002 | Takamoto | G02B 26/0833 348/771 |
| 6,672,724 | B1 | 1/2004 | Peterson | G03B 21/28 348/E9.027 |
| 6,864,967 | B2* | 3/2005 | Kimura | G01M 11/333 356/73.1 |
| 7,027,137 | B2* | 4/2006 | Kimura | G01M 11/333 356/73.1 |
| 7,130,031 | B2* | 10/2006 | Kimura | G01M 11/333 356/73.1 |
| 8,267,522 | B2* | 9/2012 | Maeda | G02B 27/1046 353/20 |
| 9,897,899 | B2* | 2/2018 | Hu | G03B 33/06 |
| 10,587,849 | B2* | 3/2020 | Hayashi | H04N 9/3129 |
| 2001/0006420 | A1* | 7/2001 | Kato | G01B 11/306 356/498 |
| 2001/0052974 | A1* | 12/2001 | Kimura | G01N 21/412 356/73.1 |
| 2003/0151834 | A1 | 8/2003 | Penn | |
| 2004/0179188 | A1* | 9/2004 | Kimura | G01N 21/412 356/73.1 |
| 2004/0179189 | A1* | 9/2004 | Kimura | G01M 11/338 356/73.1 |
| 2005/0013021 | A1* | 1/2005 | Takahashi | G02B 17/0832 359/837 |
| 2006/0152686 | A1 | 7/2006 | Yeralan et al. | |
| 2006/0274273 | A1 | 12/2006 | Mihalakis | |
| 2009/0140974 | A1 | 6/2009 | Maeda | |
| 2010/0238410 | A1* | 9/2010 | Maeda | G02B 27/142 353/20 |
| 2011/0176120 | A1 | 7/2011 | Geissler et al. | |
| 2012/0038819 | A1 | 2/2012 | McMackin et al. | |
| 2012/0113395 | A1 | 5/2012 | Chang et al. | |
| 2015/0346582 | A1* | 12/2015 | Aikio | G03B 37/06 348/36 |
| 2016/0295182 | A1 | 10/2016 | Gao et al. | |
| 2017/0003582 | A1 | 1/2017 | Pan et al. | |
| 2017/0280117 | A1* | 9/2017 | Ogi | H04N 9/3155 |
| 2018/0013992 | A1* | 1/2018 | Hayashi | G02B 27/0101 |
| 2020/0092523 | A1* | 3/2020 | Peuhkurinen | H04N 9/3194 |

FOREIGN PATENT DOCUMENTS

| | | |
|---|---|---|
| GB | 2356067 A | 5/2001 |
| JP | 2000-258703 | 9/2000 |
| JP | 2004-258439 | 9/2004 |
| JP | 2006-023574 | 1/2006 |
| JP | 2007-178945 | 7/2007 |
| JP | 2007-256680 | 10/2007 |
| JP | 2019-082506 | 5/2019 |
| WO | 2014/142967 A1 | 9/2014 |

OTHER PUBLICATIONS

Office Action dated May 28, 2021 in Chinese Patent Application No. 201911030078.7, 11 pages.
Office Action dated Jun. 30, 2021 in European Patent Application No. 19 196 245.5, 7 pages.

* cited by examiner

OPTICAL SYSTEM AND IMAGE PROJECTION APPARATUS INCLUDING AN INTERFACE THAT TRANSMITS OR REFLECTS LIGHT

CROSS-REFERENCE TO RELATED APPLICATION

This patent application is based on and claims priority pursuant to 35 U.S.C. § 119(a) to Japanese Patent Application No. 2018-205180, filed on Oct. 31, 2018 and Japanese Patent Application No. 2019-132802, filed on Jul. 18, 2019, in the Japan Patent Office, the entire disclosure of which are hereby incorporated by reference herein.

BACKGROUND

Technical Field

Embodiments of the present disclosure relate to an optical system, an image projection apparatus, and a mobile object.

Related Art

With the advent of the multimedia era, image projection apparatuses are used in various situations. In recent years, such image projection apparatuses are developed not only as front projection projectors but also as heads-up displays (HUDs), and the market field is expanding. Optical systems incorporating digital micromirror devices (DMDs) as optical modulation elements are mainstream to configure such devices, and size and weight reduction, high luminance and high dynamic range (high contrast) are advanced.

SUMMARY

In one aspect of this disclosure, there is provided an improved optical system including an optical element configured to emit light emitted from a light source; and an optical modulation element configured to receive the light emitted from the optical element and emit first light rays in a first direction and second light rays in a second direction different from the first direction. The optical element has an interface that transmits one and reflects the other of: the first light rays to be directed to a projection target; and the second light rays and the light emitted from the light source.

In another aspect of this disclosure, there is provided an improved image projection apparatus for projecting an image, the image projection apparatus including the above-described optical system.

In still another aspect of this disclosure, there is provided an improved mobile object including the above-described image projection apparatus.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
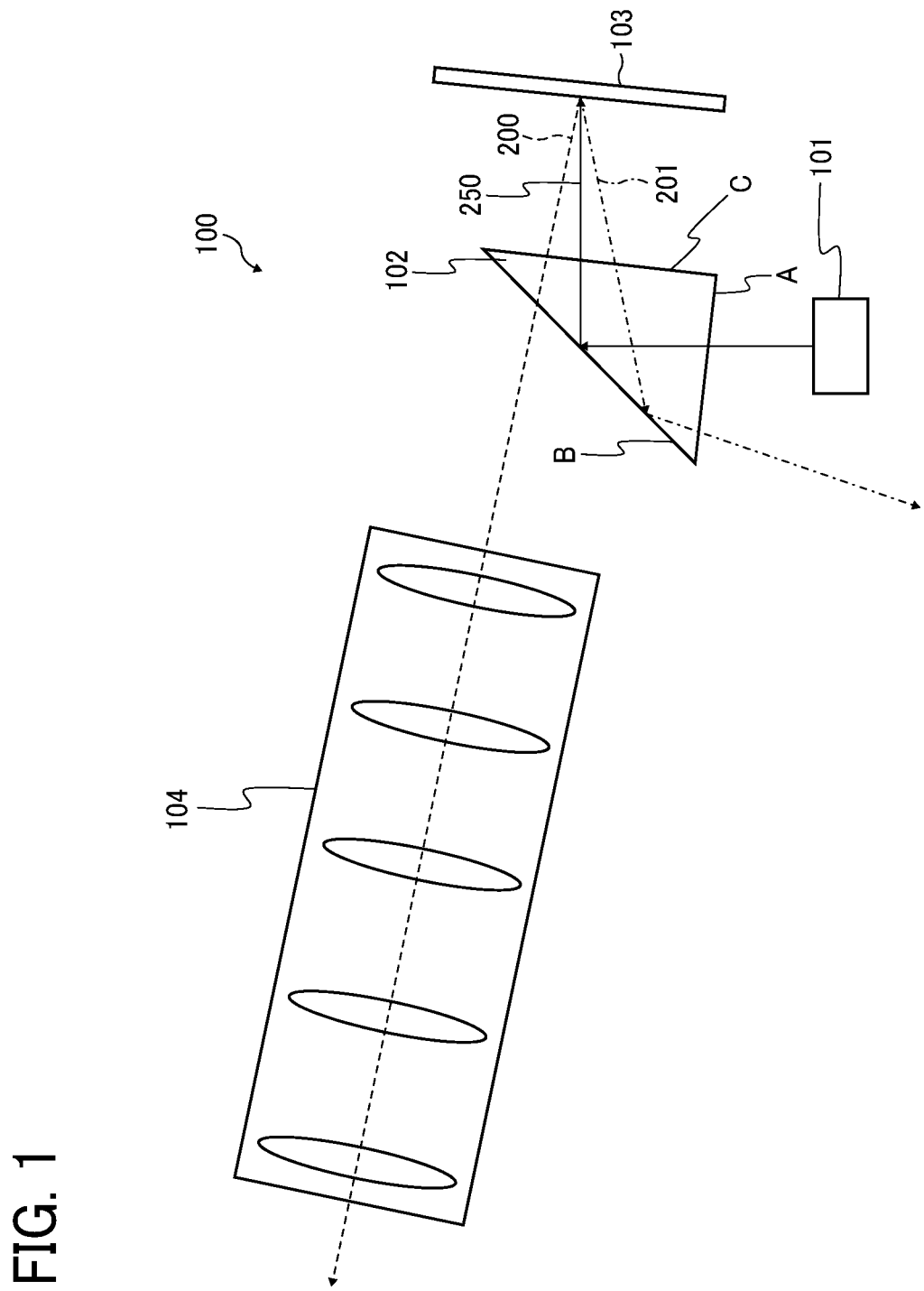
FIG. 1 is a cross-sectional view of an optical system according to an embodiment.

The embodiments of the present disclosure provide an optical system capable of substantially eliminating the influence of unwanted light while providing a compact optical path, an image projection apparatus incorporating the optical system, and a mobile object incorporating the optical system and the image projection apparatus.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

FIG. 1 is a cross-sectional view of an optical system 100 according to an embodiment.

The optical system 100 includes a light source 101 that emits light, an optical element 102 that transmits or reflects incident light, and an optical modulation element 103 that emits incident light in a first direction or a second direction different from the first direction. The optical system 100 further includes a projector 104 as an example of a projection optical system that projects incident light toward a projection target.

The light source 101 includes laser diodes (LDs), three-color light sources corresponding to three colors of red (R), blue (B), and green (G), and a dichroic mirror configured to reflect light of a predetermined wavelength and transmit light of a certain wavelength.

Further, it is preferable that the optical element 102 is substantially constituted by a prism having two or more surfaces. In the present embodiment, the optical element 102 is substantially constituted by a total reflection triangular prism unit (that is a total internal reflection (TIR) prism unit).

The optical modulation element 103 is substantially constituted by a digital micromirror device (DMD) having a substantially rectangular mirror surface that includes a plurality of micromirrors.

In such a configuration, the optical element 102 has a boundary surface B (interface) that reflects light 250 emitted from the light source 101, and directs the emitted light 250 to the optical modulation element 103. Thus, the light 250 strikes on the optical modulation element 103 (the light 250 is light incident on the optical modulation element 103). In some examples, a relay optical system may be disposed between the light source 101 and the optical element 102, so as to direct the light 250 emitted from the light source 101 toward the optical element 102.

The optical modulation element 103 switches between a mode to reflect the light 250 in the first direction and emitting first light rays 200 and another mode to reflect the light 250 in the second direction and emit second light rays 201 by driving each micromirror in a time-sharing manner. The first light rays 200 emitted from the optical modulation element 103 travel on the opposite side of the second light rays 201 emitted from the optical modulation element 103 across the light rays of the light 250 incident on the optical modulation element 103.

The optical element 102 transmits, through the boundary surface B and the boundary surface C, the first light rays 200 emitted in the first direction from the optical modulation element 103, and reflects at the boundary surface B the second light rays 201 emitted in the second direction from the optical modulation element 103.

The first light rays 200 that has passed through the optical element 102 is directed into the projection unit 104, and then is projected from the projection unit 104 to the projection target. The second light rays 201 reflected by the optical element 102 are treated as unwanted light. For example, the second light rays 201 strikes on the mechanically textured surface or light absorption band so that re-reflection of the second light rays 201 is prevented.

With such a configuration, the second light rays 201 are kept away from the first light rays 200, thus preventing the second light rays 201 from entering the projection unit 104. This configuration can increase the difference in the luminance of the projection target between the mode to emit the first light rays 200 from the optical modulation element 103 and another mode to emit the second light rays 201 from the optical modulation element 103.

Further, the light rays of the light 250 incident on the optical modulation element 103 travel between the first light rays 200 emitted from the optical modulation element 103 and the second light rays 201 emitted from the optical modulation element 103. This configuration can provide a compact structure of optical paths and reduce the size of the compact optical element 102.

Further, the following configurations provide a compact optical system 100: the same optical element 102 is shared between the incident side and the exit side of the optical modulation element 103; and the light 250 emitted from the light source 101 and the second light rays 201 are reflected by the same boundary surface B of the optical element 102.

Further, the boundary surface B transmits the first light rays 200 and reflects the second light rays 201 and the light 250 emitted from the light source 101, that is, the reflection and transmission of light occur on the same boundary surface. Accordingly, the second light rays 201 and the emitted light 250 travel at the same side relative to the first light rays 200. This configuration provides a compact optical element 102 and a compact optical system 100.

Figure 2:
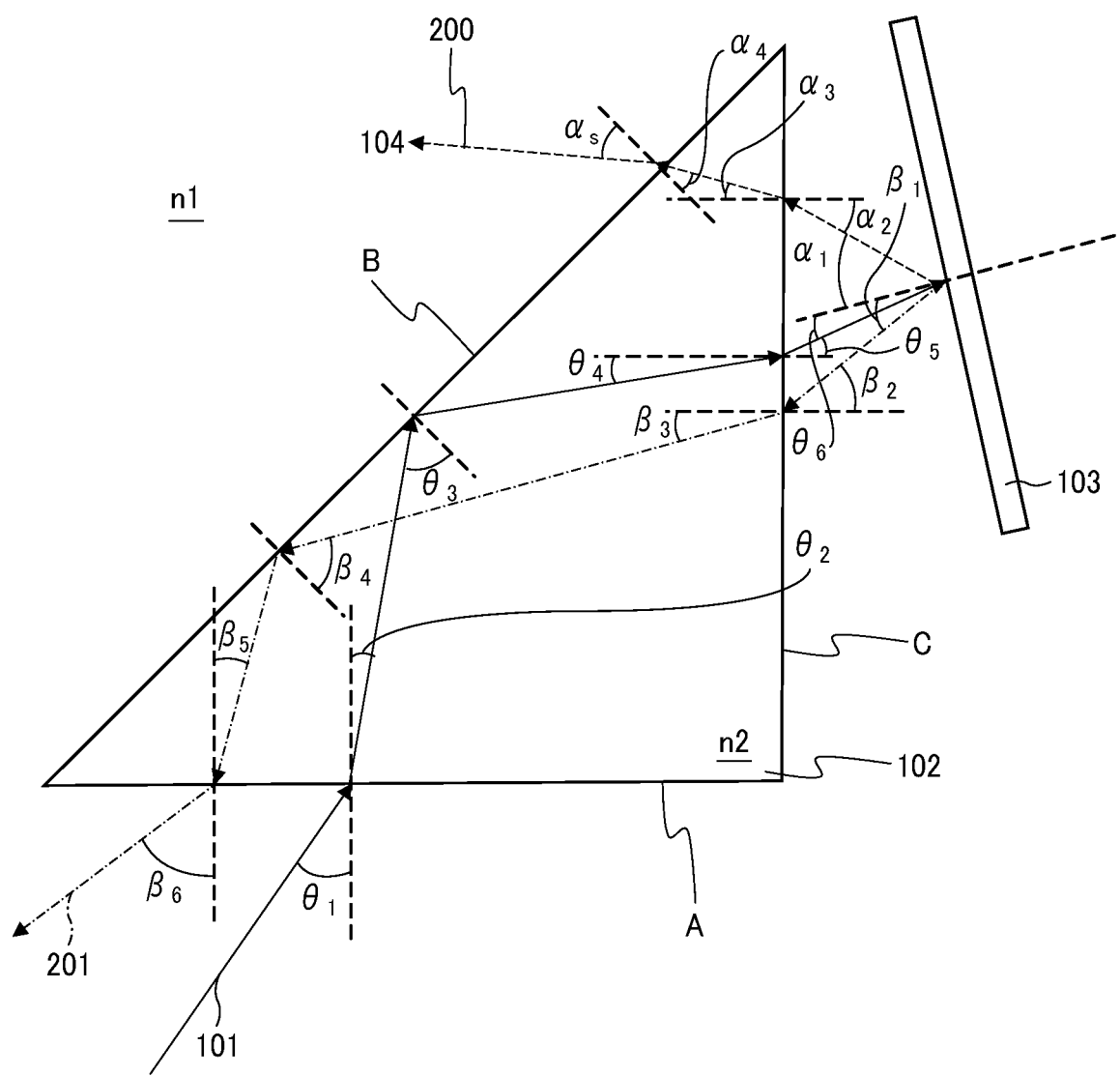
FIG. 2 is a cross-sectional view for describing optical paths of light rays from an optical element and an optical modulation element in FIG. 1.

FIG. 2 is a cross-sectional view for describing optical paths of light rays from the optical element 102 and the optical modulation element 103 in FIG. 1.

First, the light 250 (indicated by solid lines) emitted from the light source 101 is incident on at an angle (incident angle) of θ1, and is refracted at an angle of θ2 by a boundary surface (interface) A between the external environment of a refractive index n1 and the optical element 102 of a refractive index n2. The relation between θ1 and θ2 is in accordance with the Snell's law (n2/n1=sin θ1/sin θ2). The relation between the refractive indexes n1 and n2 is n1<n2 (n1 is less than n2).

Light rays having a component of the angle of θ2 after passing through the boundary surface A reach (strike on) the boundary surface B of the optical element 102 at an angle of θ3. At this time, the light rays are totally reflected by boundary surface B under the following condition when θc denotes the critical angle of the total reflection condition: θ3≥θc: θc[=arcsin(n1/n2) {n1<n2}])

The light rays totally reflected by the boundary surface B reach (strike on) the boundary surface (interface) C of the optical element 102 at an angle θ4, and exit the optical element 102 at an angle (refraction angle) of θ5 to the external environment.

Then, the light rays strike on the surface of the optical modulation element 103 at an angle of θ6, thus entering the optical modulation element 103 as the (incident) light 250. Subsequently, the incident light 250 is reflected and modulated by the optical modulation element 103.

The light modulated by the optical modulation element 103 is classified at least into the first light rays 200 emitted in α direction (first direction) and the second light rays 201 emitted in β direction (second direction). The first light rays 200 are directed to the projection unit 104 as needed light, and the second light rays 201 are directed to a position different from the position of the projection unit 104 as unwanted light.

The first light rays 200 indicated by broken lines are reflected by the optical modulation element 103 so as to form an angle α1 relative to the normal of the surface of the optical modulation element 103. Then, the first light rays 200 are incident on the boundary surface C at an angle (incident angle) of α2, and refracted by the optical element 102 at an angle (refraction angle) of α3, proceeding within the optical element 102.

Subsequently, the first light rays 200 reach the boundary surface B at an angle α4 less than θc (α4<θc), and exit the optical element 102 at an angle (refraction angle) of α5 to the external environment. Then, the first light rays 200 are directed to the projection unit 104.

By contrast, the second light rays 201 (indicated by one-dot chain lines) are reflected by the optical modulation element 103 so as to form an angle of β1 relative to the normal of the surface of the optical modulation element 103. The second light rays 201 travel on the opposite side of the first light rays 200 across the light rays of the light 250 incident on the optical modulation element 103.

The second light rays 201 strike on the boundary surface C at an angle (incident angle) of β2, and are refracted by the optical element 102 at an angle (refraction angle) of β3, proceeding through the optical element 102. Then, the second light rays 201 reach the boundary surface B at an angle of β4 greater than or equal to θc (β4≥θc), and are totally reflected by boundary surface B. Then, the second light rays 201 are directed to the boundary surface A, and exits the optical element 102 at an angle of (refraction angle) of β6 to the external environment.

The second light rays 201 strike on the mechanically textured surface or light absorption band, for example, so that re-reflection of the second light rays 201 is prevented.

Assuming that the refractive index n1 of the external environment is 1.00 and the refractive index n2 of the optical element 102 is 1.59, specific example values of various parameters are as follows.

θc=38.9 {=arcsin(1.00/1.59)}
θ1=0
θ2=0
θ3=46.2 {≥θc}
θ4=2.4
θ5=3.8
θ6=3.8
α1=27.8
α2=27.8
α3=17.0
α4=26.8 {<θc}
α5=45.8
β1=20.2
β2=20.2
β3=12.5
β4=56.4 {≥θc}
β5=10.2
β6=16.3

With the above-described configuration, the first light rays 200 as needed light is separated from the second light rays 201 as unwanted light, with respect to the boundary surface B of the optical element 102. Thus, the second light rays 201 are kept away from the first light rays 200. Accordingly, the second light rays 201 can be substantially prevented from entering the projection unit 104. This configuration can increase the difference in the luminance of the projection target between the mode to emit the first light rays 200 from the optical modulation element 103 and another mode to emit the second light rays 201 from the optical modulation element 103.

Further, the light rays of the light 250 incident on the optical modulation element 103 travel between the first light rays 200 emitted from the optical modulation element 103 and the second light rays 201 emitted from the optical modulation element 103. This configuration can provide a compact structure of optical paths and reduce the size of the compact optical element 102.

Further, the following configurations provide a compact optical system 100: the same optical element 102 is shared between the incident side and the exit side of the optical modulation element 103; and the light 250 emitted from the light source 101 and the second light rays 201 are reflected by the same boundary surface B of the optical element 102.

Further, the boundary surface B transmits the first light rays 200 and reflects the second light rays 201 and the light 250 emitted from the light source 101, that is, the reflection and transmission of light occur on the same boundary surface. Accordingly, the second light rays 201 and the emitted light 250 travel at the same side relative to the first light rays 200. This configuration provides a compact optical element 102 and a compact optical system 100.

Figure 3A:
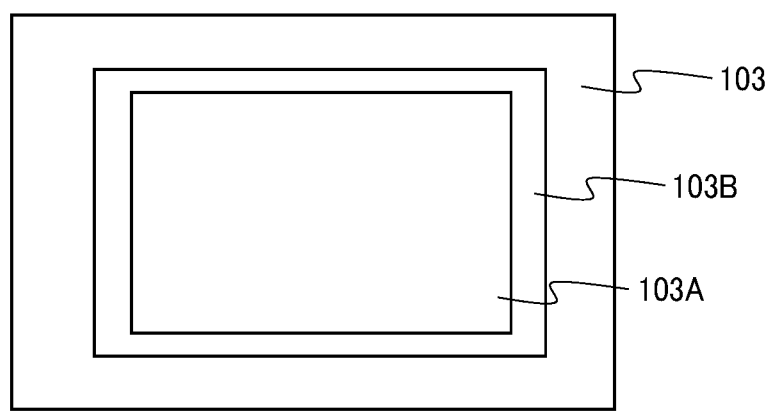
FIGS. 3A and 3B are illustrations of the configuration of the optical modulation element FIG. 1.
Figure 3B:
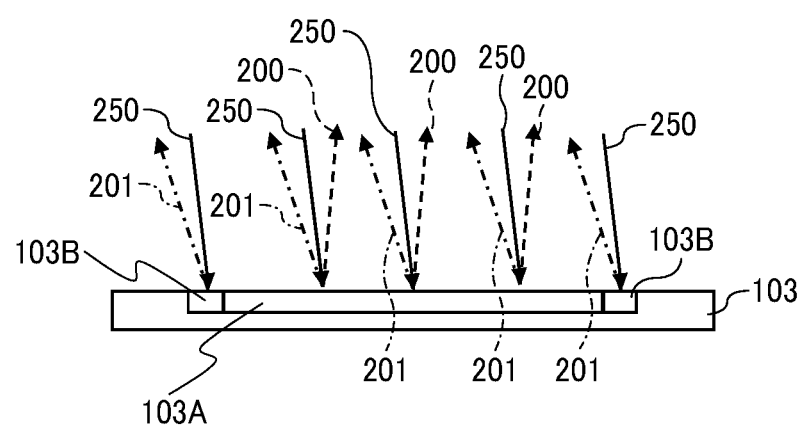

FIGS. 3A and 3B are illustrations of the configuration of the optical modulation element 103 in FIG. 1. FIG. 3A is a top view of the optical modulation element 103, and FIG. 3B is a cross-sectional view of the optical modulation element 103.

The optical modulation element 103 has a variable area 103A and a fixed area 103B surrounding the variable area 103A. The variable area 103A is to modulate the light 250 incident thereon to emit the light rays in the first direction or in the second direction. The fixed area 103B is to emit the incident light 250 in a fixed direction, i.e., the second direction without modulating the incident light 250.

As described above with reference to FIGS. 1 and 2, the first light rays 200 emitted from the optical modulation element 103 in the first direction is directed into the projection unit 104, and then is projected from the projection unit 104 to the projection target. The second light rays 201 emitted from the optical modulation element 103 in the second direction is treated as unwanted light.

In the present embodiment, the light emitted from the fixed area 103B is only light parallel to the second light rays 201, and does not include any light parallel to the first light rays 200. That is, any light emitted from the fixed area 103B is not directed to the projection unit 104.

Accordingly, the light from the fixed area 103B is not projected to the projection target while the second light rays 201 are emitted as unwanted light from the variable area 103A. This configuration can increase the difference in the luminance of the projection target between the mode to emit the first light rays 200 from the optical modulation element 103 and another mode to emit the second light rays 201 from the optical modulation element 103.

Figure 4:
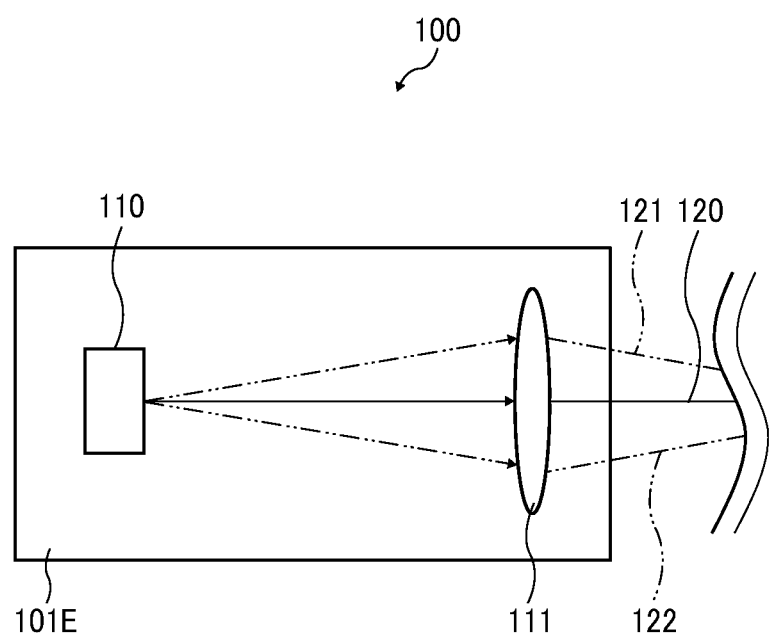
FIG. 4 is a cross-sectional view of a part of a configuration of an optical system according to a variation of the embodiment in FIG. 1.

FIG. 4 is a cross-sectional view of a part of the configuration of the optical system 100 according to a variation of the embodiment in FIG. 1.

The optical system 100 in FIG. 4 includes a light source 101E including a light-emitting diode (LED) light source optical system, in substitution for the light source 101 including an LD in FIG. 1.

The light source 101E includes an LED 110 that diverges and emits light, and a coupling lens 111 that gently focuses the light emitted from the LED 110. Each of the upper light ray 121 and the lower light ray 122 of the light emitted from the coupling lens 111 forms an angle of 10 degrees relative to the principal light ray 120 of the light emitted from the coupling lens 111.

In the present variation, the upper light ray 121 and the lower light ray 122 are incident on the optical element 102 with an angle of 10 degrees relative to the principal light ray 120. However, the same applies to the upper light ray 121 and the lower light ray 122 as in the light 250 emitted from the light source 101 in FIGS. 1 and 2.

Assuming that the refractive index n1 of the external environment is 1.00 and the refractive index n2 of the optical element 102 is 1.59, specific example values of various parameters for the principal light ray 120 are as follows.

$\theta c$=38.9 {=arcsin(1.00/1.59)}
$\theta 1$=0
$\theta 2$=0
$\theta 3$=46.2 {≥$\theta c$}
$\theta 4$=2.4
$\theta 5$=3.8
$\theta 6$=3.8
$\alpha 1$=27.8
$\alpha 2$=27.8
$\alpha 3$=17.0
$\alpha 4$=26.8 {<$\theta c$}
$\alpha 5$=45.8
$\beta 1$=20.2
$\beta 2$=20.2
$\beta 3$=12.5
$\beta 4$=56.4 {≥$\theta c$}
$\beta 5$=10.2
$\beta 6$=16.3

Since the upper light ray 121 corresponds to light incident on the optical element 102 at an angle $\theta 1$ of 10 degrees, specific example values of various parameters in the upper light ray 121 are as follows.

$\theta 1$=10.0
$\theta 2$=6.3
$\theta 3$=39.9 {$\theta c$}
$\theta 4$=6.3
$\theta 5$=10.0
$\theta 6$=10.0
$\alpha 1$=17.8
$\alpha 2$=17.8
$\alpha 3$=11.1
$\alpha 4$=32.7 {<$\theta c$}
$\alpha 5$=59.4
$\beta 1$=30.2
$\beta 2$=30.2
$\beta 3$=18.4
$\beta 4$=62.2 {≥$\theta c$}
$\beta 5$=16.0
$\beta 6$=26.1

Same as the upper light ray 121, the lower light ray 122 has the following specific example values of various parameters.

$\theta 1$=10.0
$\theta 2$=6.3
$\theta 3$=52.5 {$\theta c$}
$\theta 4$=8.6
$\theta 5$=13.8
$\theta 6$=13.8
$\alpha 1$=37.8
$\alpha 2$=37.8
$\alpha 3$=22.7
$\alpha 4$=21.1 {<$\theta c$}
$\alpha 5$=35.0
$\beta 1$=10.2
$\beta 2$=10.2
$\beta 3$=6.4
$\beta 4$=50.2 {$\theta c$}
$\beta 5$=4.0
$\beta 6$=6.4

With the above-described configuration, the first light rays 200 as needed light is separated from the second light rays 201 as unwanted light, with respect to the boundary surface B of the optical element 102. Thus, the second light rays 201 are kept away from the first light rays 200. Accordingly, the second light rays 201 can be substantially prevented from entering the projection unit 104. This configuration can increase the difference in the luminance of the projection target between the mode to emit the first light rays 200 from the optical modulation element 103 and another mode to emit the second light rays 201 from the optical modulation element 103.

Further, the light rays of the light 250 (the principal light ray 120) incident on the optical modulation element 103 travel between the first light rays 200 from the optical modulation element 103 and the second light rays 201 from the optical modulation element 103. This configuration can provide a compact structure of optical paths and reduce the size of the compact optical element 102.

Further, the following configurations provide a compact optical system 100: the same optical element 102 is shared between the incident side and the exit side of the optical modulation element 103; and the light 250 emitted from the light source 101 and the second light rays 201 are reflected by the same boundary surface B of the optical element 102.

Further, the boundary surface B transmits the first light rays 200 and reflects the second light rays 201 and the light 250 emitted from the light source 101, that is, the reflection and transmission of light occur on the same boundary surface. Accordingly, the second light rays 201 and the emitted light 250 travel at the same side relative to the first light rays 200. This configuration provides a compact optical element 102 and a compact optical system 100.

Figure 5:
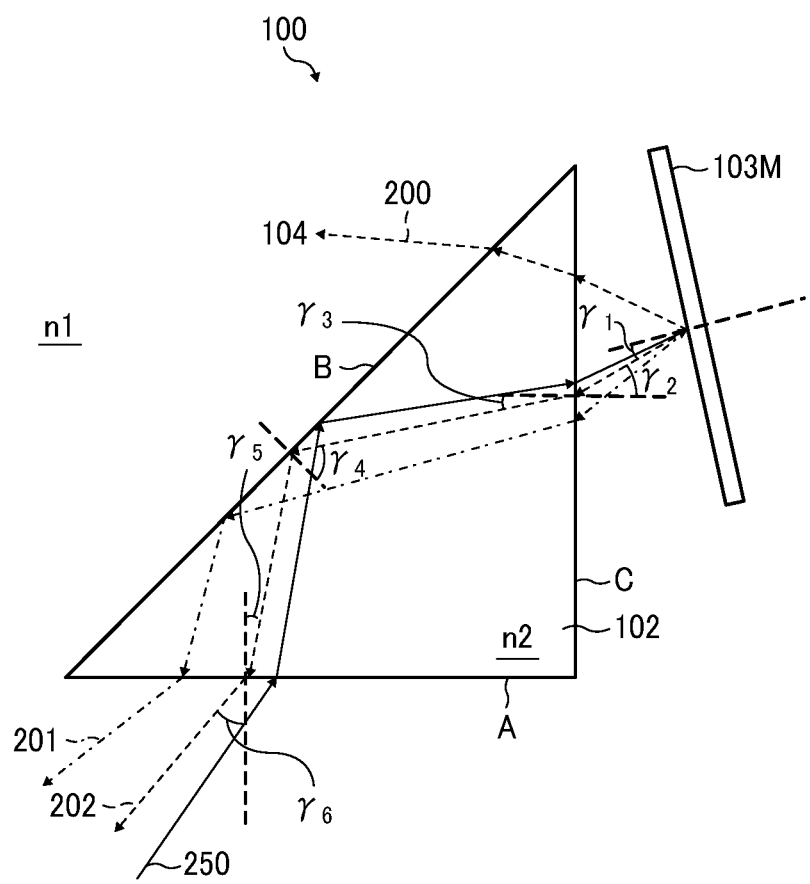
FIG. 5 is a cross-sectional view for describing optical paths of light rays from the optical element and the optical modulation element of an optical system according to a second variation of the embodiment in FIG. 1.

FIG. 5 is a cross-sectional view for describing optical paths of light rays from the optical element 102 and the optical modulation element 103M of an optical system 100 according to a second variation of the embodiment illustrated in FIG. 1.

The optical system 100 in FIG. 5 includes an optical modulation element 103M substantially constituted by a micro-electromechanical systems (MEMS), in substitution for the optical modulation element 103 substantially constituted by the DMD in FIG. 1.

The light modulated and emitted by the optical modulation element 103M is scanned between the $\alpha$ direction (the first direction) and the $\beta$ direction (the second direction). In other words, the light modulated and emitted by the optical modulation element 103M is categorized into the first light rays 200 emitted in the $\alpha$ direction (the first direction), the second light rays 201 in the $\beta$ direction (the second direction) as in FIG. 2, and third light rays 202 emitted in $\gamma$ direction (third direction).

The optical paths of the first light rays 200 and the second light rays 201 are the same as those in FIG. 2.

The third light rays 202 travels within the scanning range of the optical modulation element 103M, that is, travels between the first light rays 200 and the second light rays 201. In the optical path of the third light rays 202, the incident angle relative to the boundary surface B of the optical element 102 is equal to the critical angle.

The third light rays 202 are reflected by the optical modulation element 103M so as to form an angle $\gamma 1$ relative to the normal of the surface of the optical modulation element 103M. Then, the second light rays 200 are incident on the boundary surface C of the optical element 102 at an angle (incident angle) of γ2, and refracted by the optical element 102 at an angle (refraction angle) of γ3, proceeding within the optical element 102.

Subsequently, the third light rays 202 reach (strike on) the boundary surface B at an angle of γ4 equal to θc, and are totally reflected by the boundary surface B. Thus, the reflected third light rays 202 are directed to the boundary surface A of the optical element 102 without exiting through the boundary surface B to the external environment.

The third light rays 202 strikes on the boundary surface A at an angle of γ5, and exits through the boundary surface A to the external environment at an angle (refraction angle) of γ6. With respect to the angle of γ4 of the third light rays 202 incident on the boundary surface B, the light emitted from the optical modulation element 103M is switched between the needed light to pass through the boundary surface B same as the first light rays 200 and the unwanted light to be reflected by the boundary surface B same as the second light rays 201.

Assuming that the scanning range of the optical modulation element 103M is 24 degrees (±12 degrees), the refractive index n1 of the external environment is 1.00, and the refractive index n2 of the optical element 102 is 1.59, specific example values of various parameters are as follows. θc=38.9 {=arcsin(1.00/1.59)}
θ1=0
θ2=0
θ3=46.2 {≥θc}
θ4=2.4
θ5=3.8
θ6=3.8
α1=27.8
α2=27.8
α3=17.0
α4=26.8 {<θc}
α5=45.8
β1=20.2
β2=20.2
β3=12.5
β4=56.4 {>θc}
β5=10.2
β6=16.3
γ1=7.8
γ2=7.8
γ3=4.9
γ4=38.9 {=θc}
γ5=7.3
γ6=11.6

With the above-described configuration, the first light rays 200 as needed light is separated from the second light rays 201 as unwanted light, with respect to the boundary surface B of the optical element 102. Thus, the second light rays 201 are kept away from the first light rays 200. Accordingly, the second light rays 201 can be substantially prevented from entering the projection unit 104. This configuration can increase the difference in the luminance of the projection target between the mode to emit the first light rays 200 from the optical modulation element 103M and another mode to emit the second light rays 201 from the optical modulation element 103M.

Further, the light rays of the light 250 incident on the optical modulation element 103M travel between the first light rays 200 emitted from the optical modulation element 103M and the second light rays 201 emitted from the optical modulation element 103M. This configuration can provide a compact structure of optical paths and reduce the size of the compact optical element 102.

Further, the following configurations provide a compact optical system 100: the same optical element 102 is shared between the incident side and the exit side of the optical modulation element 103M; and the light 250 emitted from the light source 101 and the second light rays 201 are reflected by the same boundary surface B of the optical element 102.

Further, the boundary surface B transmits the first light rays 200 and reflects the second light rays 201 and the light 250 emitted from the light source 101, that is, the reflection and transmission of light occur on the same boundary surface. Accordingly, the second light rays 201 and the emitted light 250 travel at the same side relative to the first light rays 200. This configuration provides a compact optical element 102 and a compact optical system 100.

Figure 6:
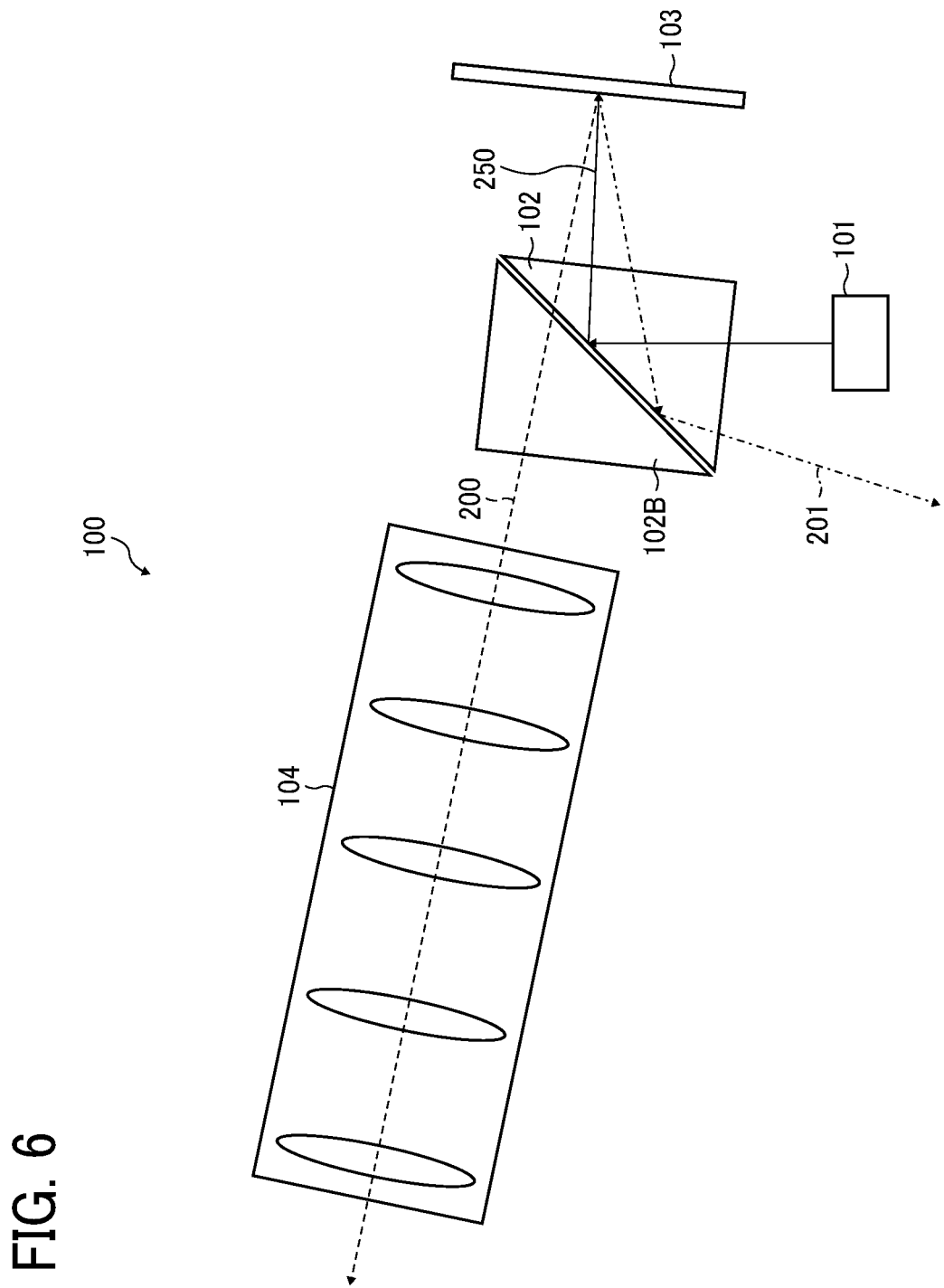
FIG. 6 is a cross-sectional view of an optical system according to a third variation of the embodiment in FIG. 1.

FIG. 6 is a cross-sectional view of the optical system 100 according to a third variation of the embodiment illustrated in FIG. 1.

The optical system 100 includes an optical element 102B substantially constituted by a triangular prism in addition to the configuration illustrated in FIG. 1. The optical element 102B transmits the first light rays 200 that have passed through the optical element 102, and the first light rays 200 transmitted through the optical element 102B are directed into the projection unit 104. Thus, the projection unit 104 projects the first light rays 200 onto the projection target. This facilitates correction of aberrations and adjustment of the emission direction.

Figure 7:
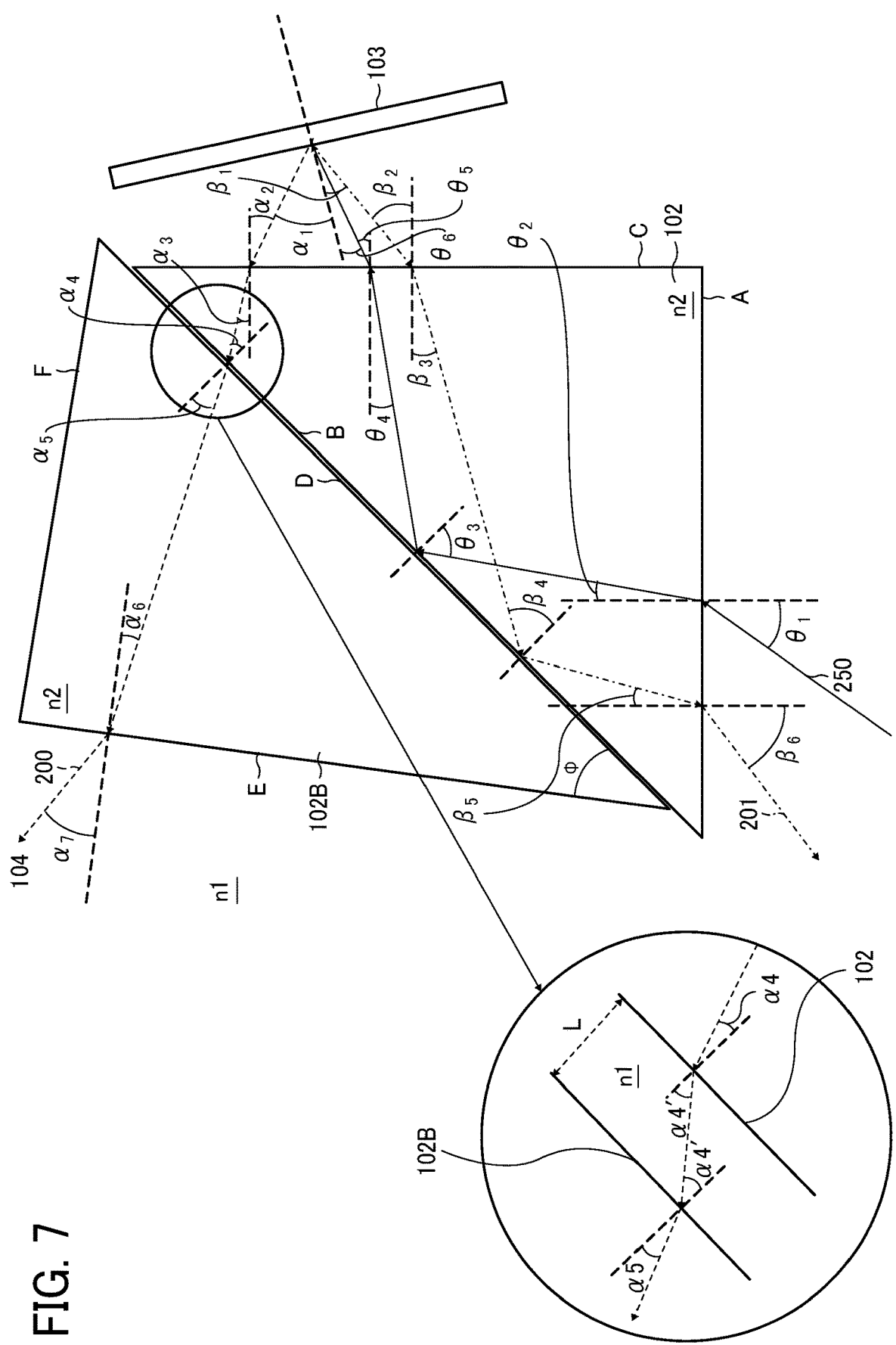
FIG. 7 is a cross-sectional view for describing optical paths of light rays from an optical element, another optical element, and an optical modulation element in FIG. 6.

FIG. 7 is a cross-sectional view for describing optical paths of light rays of the optical element 102, an optical element 102B, and the optical modulation element 103 in FIG. 6. In FIG. 7, the circle in the lower left of this figure is an enlarged view of a portion surrounded by the circle in the upper right.

The optical paths of the incident light (emitted light) 250 and the second light rays 201 are the same as those in FIG. 2, and thus their description is omitted.

The first light rays 200 indicated by broken lines are reflected by the optical modulation element 103 so as to form an angle α1 relative to the normal of the surface of the optical modulation element 103. Then, the first light rays 200 are incident on the boundary surface C of the optical element 102 at an angle (incident angle) of α2, and refracted by the optical element 102 at an angle (refraction angle) of α3, proceeding within the optical element 102.

Subsequently, the first light rays 200 reach the boundary surface B at an angle of α4 less than θc (α4<θc), and exit the optical element 102 at an angle (refraction angle) of α4' to the external environment. Then, the first light rays 200 strike on the boundary surface (interface) D of the optical element 102B at a refraction angle of α4'. The optical element 102B has a refractive index of n2, and the angle formed by the boundary surface D and the boundary surface (interface) E is an angle of φ.

An air layer having a refractive index of n1 is formed between the optical element 102 and the optical element 102B. The optical element 102 and the optical element 102B are arranged so that the boundary surface B of the optical element 102 and the boundary surface D of the optical element 102B are parallel to each other. Accordingly, the incident angle α4 on the boundary surface B is equal to the refraction angle α5 on the boundary surface D. Increasing the area of the air layer between the optical element 102 and the optical element 102B has a greater effect on a projected image. In view of this, a spacing L between the optical element 102 and the optical element 102B (the length of the air layer) is preferably 10 micrometers (μm) or less.

The first light rays 200 advances within the optical element 102B at a refraction angle of α5, and reaches the boundary surface E of the optical element 102B at an angle of α6 less than θc (α6<θc). Then, the first light rays 200 is emitted from the optical element 102B at an angle of α7 to the external environment, and directed to the projection unit 104.

Assuming that the refractive index n1 of the external environment is 1.00 and the refractive index n2 of the optical element 102 is 1.59, specific example values of various parameters are as follows.

θc=38.9 {=arcsin(1.00/1.59)} φ=40.0
θ1=0
θ2=0
θ3=46.2 {≥θc}
θ4=2.4
θ5=3.8
θ6=3.8
α1=27.8
α2=27.8
α3=17.0
α4=26.8 {<θc}
α4'=45.8
α5=26.8
α6=13.2 {<θc}
α7=21.3
β1=20.2
β2=20.2
β3=12.5
β4=56.4 {≥θc}
β5=10.2
β6=16.3

Figure 8:
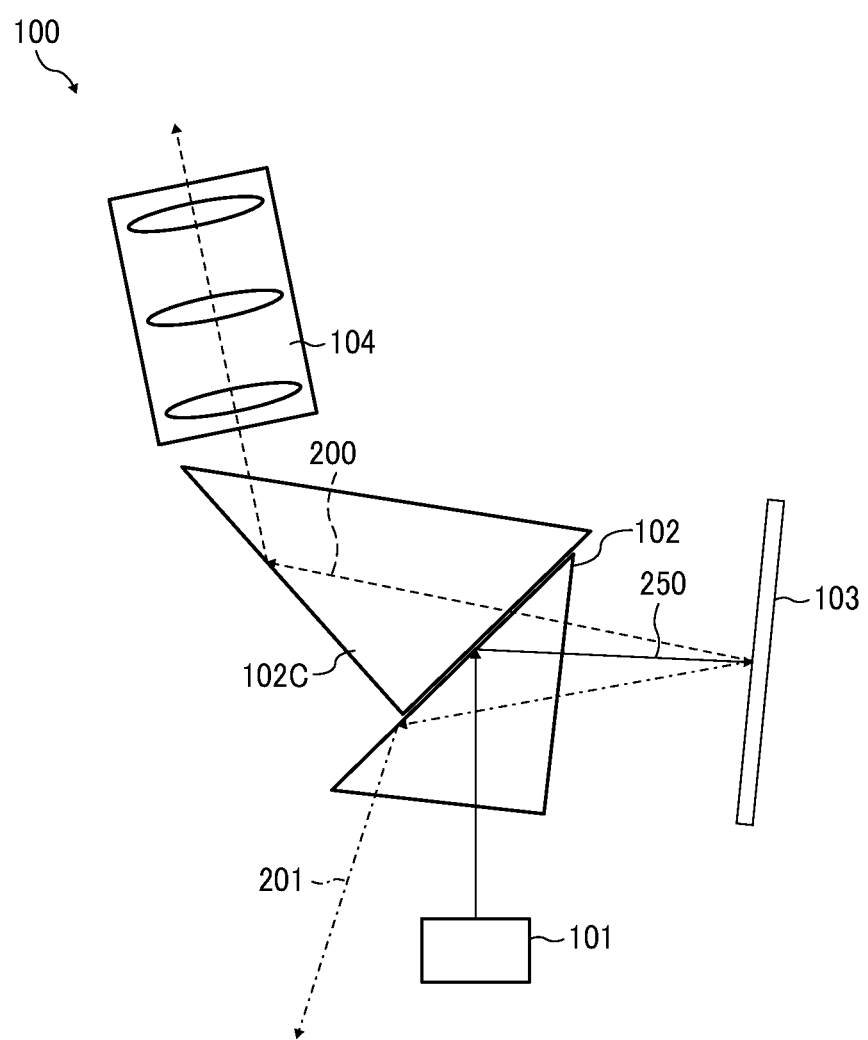
FIG. 8 is a cross-sectional view of an optical system according to a fourth variation of the embodiment in FIG. 1.

FIG. 8 is a cross-sectional view of the optical system 100 according to a fourth variation of the embodiment illustrated in FIG. 1.

The optical system 100 includes an optical element 102C substantially constituted by a triangular prism, in substitution for the optical element 102B in FIG. 6. The optical element 102C reflects the first light rays 200 that have passed through the optical element 102, and the first light rays 200 reflected by the optical element 102C are directed into the projection unit 104. Thus, the projection unit 104 projects the first light rays 200 onto the projection target.

With such a configuration, the second light rays 201 are kept further away from the first light rays 200, thus preventing the second light rays 201 from entering the projection unit 104. This configuration can reliably increase the difference in the luminance of the projection target between when the first light rays 200 are emitted from the optical modulation element 103 and when the second light rays 201 are emitted from the optical modulation element 103.

Figure 9:
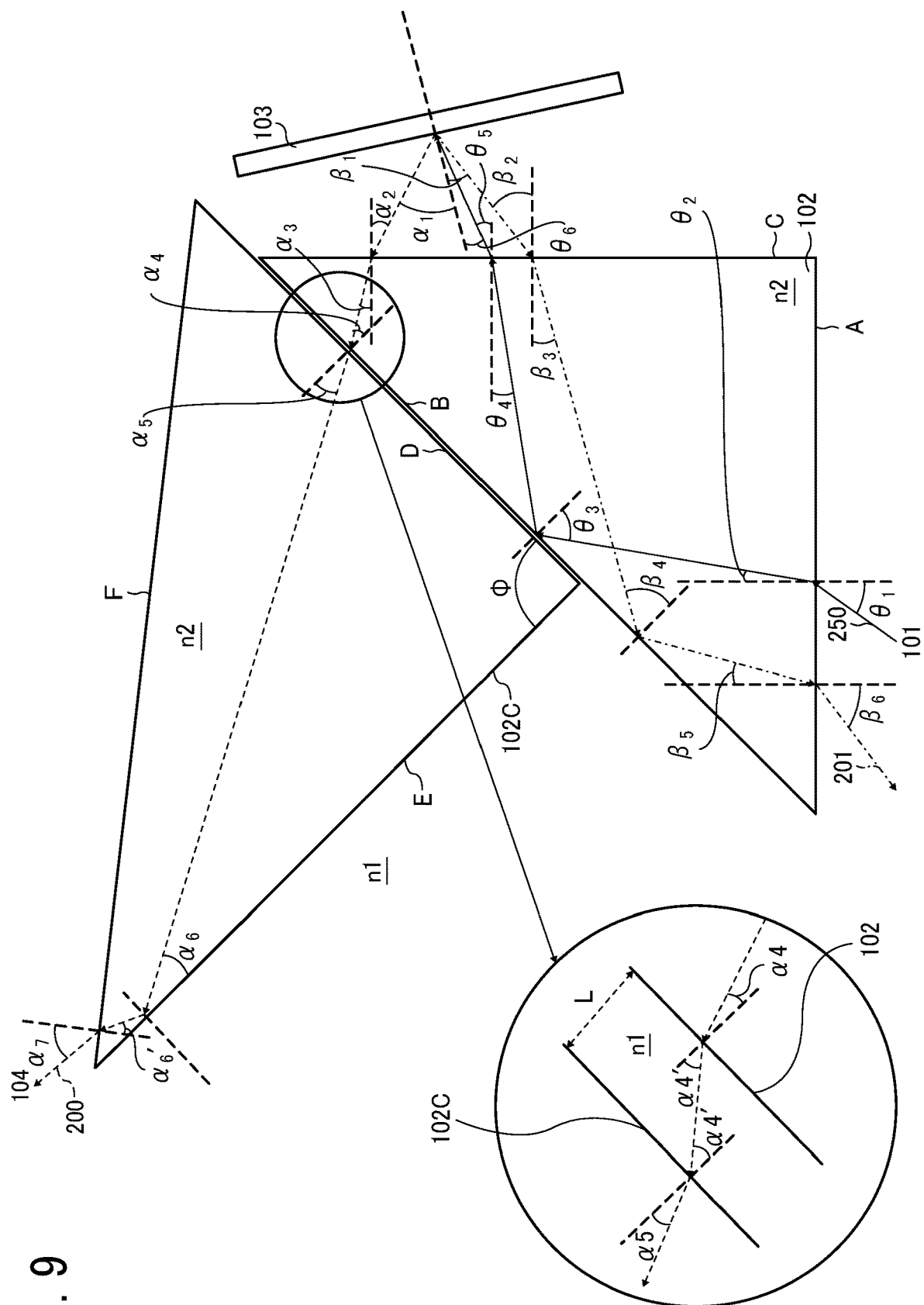
FIG. 9 is a cross-sectional view for describing optical paths of light rays from an optical element, another optical element, and an optical modulation element in FIG. 8.

FIG. 9 is a cross-sectional view for describing optical paths of light rays of the optical element 102, an optical element 102C, and the optical modulation element 103 illustrated in FIG. 8. In FIG. 9, the circle in the lower left of this figure is an enlarged view of a portion surrounded by the circle in the upper right.

The optical paths of the incident light (emitted light) 250 and the second light rays 201 are the same as those in FIG. 2, and thus their description is omitted.

The first light rays 200 indicated by broken lines are reflected by the optical modulation element 103 so as to form an angle α1 relative to the normal of the surface of the optical modulation element 103. Then, the first light rays 200 are incident on the boundary surface C of the optical element 102 at an angle (incident angle) of α2, and refracted by the optical element 102 at an angle (refraction angle) of α3, proceeding within the optical element 102.

Subsequently, the first light rays 200 reach the boundary surface B at an angle of α4 less than θc (α4<θc), and exit the optical element 102 at an angle (refraction angle) of α4' to the external environment. Then, the first light rays 200 strike on the boundary surface (interface) D of the optical element 102C at a refraction angle of α4'. The optical element 102C has a refractive index of n2, and the angle formed by the boundary surface D and the boundary surface E is an angle of φ.

An air layer having a refractive index of n1 is formed between the optical element 102 and the optical element 102C. The optical element 102 and the optical element 102C are arranged so that the boundary surface B of the optical element 102 and the boundary surface D of the optical element 102C are parallel to each other. Accordingly, the incident angle of α4 on the boundary surface B is equal to the refraction angle of α5 on the boundary surface D. Increasing the area of the air layer between the optical element 102 and the optical element 102C has a greater effect on a projected image. In view of this, a spacing L between the optical element 102 and the optical element 102C (the length of the air layer) is preferably 10 micrometers (μm) or less.

The first light rays 200 advance within the optical element 102C at a refraction angle of α5, and reaches the boundary surface E of the optical element 102C at an angle of α6 greater than or equal to θc (α6≥θc). Subsequently, the first light rays 200 are totally reflected by the boundary surface E, and strike on the boundary surface (interface) F at an angle of α6', exiting the optical element 102C at a refraction angle of α' to the external environment. Thus, the first light rays 200 are directed into the projection unit 104.

Assuming that the refractive index n1 of the external environment is 1.00 and the refractive index n2 of the optical element 102 is 1.59, specific example values of various parameters are as follows.

θc=38.9 {=arcsin(1.00/1.59)} φ=100.0
θ1=0
θ2=0
θ3=46.2 {≥θc}
θ4=2.4
θ5=3.8
θ6=3.8
α1=27.8
α2=27.8
α3=17.0
α4=26.8 {<θc}
α4'=45.8
α5=26.8
α6=73.2 {≥θc}
α6'=23.2
α7=38.9
β1=20.2
β2=20.2
β3=12.5
β4=56.4 {≥θc}
β5=10.2
β6=16.3

With such a configuration, the second light rays 201 are kept further away from the first light rays 200.

Figure 10:
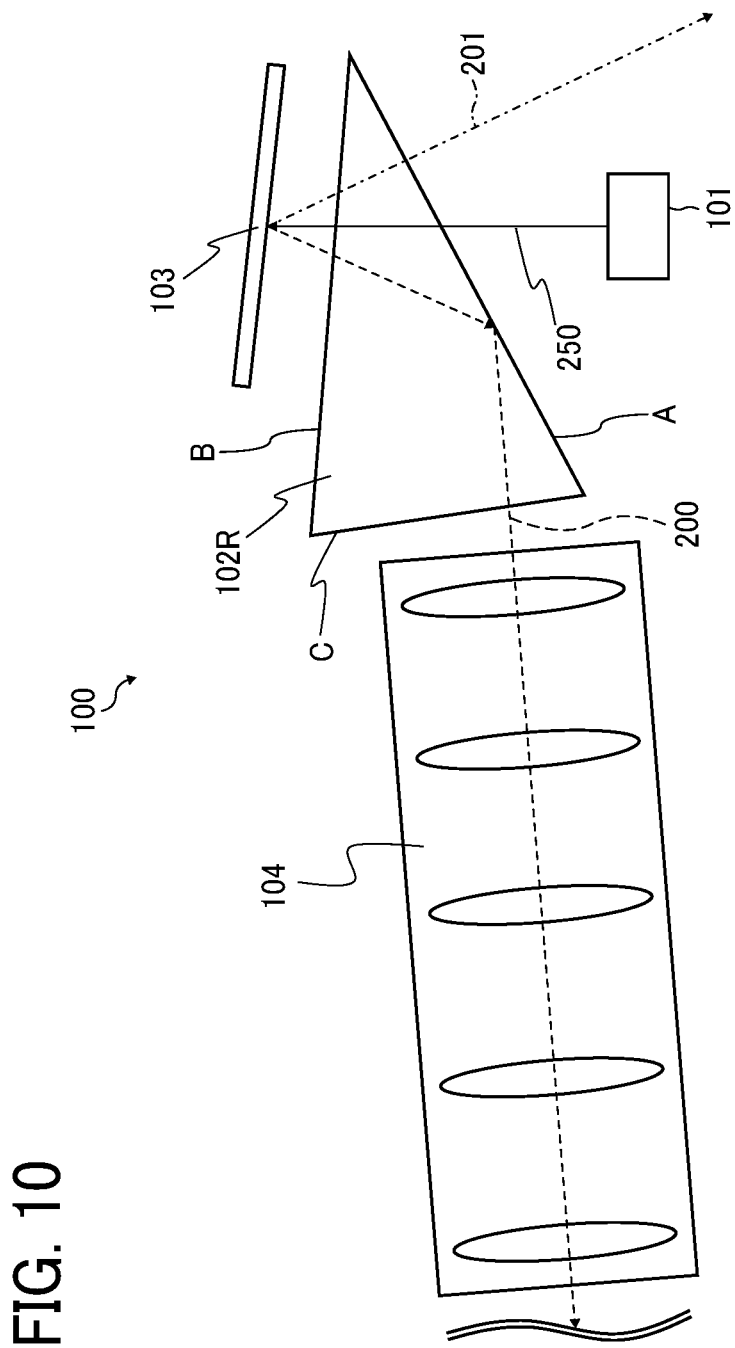
FIG. 10 is a cross-sectional view of an optical system according to a fifth variation of the embodiment in FIG. 1.

FIG. 10 is a cross-sectional view of the optical system 100 according to a fifth variation of the embodiment illustrated in FIG. 1. The optical system 100 includes an optical element 102R substantially constituted by a triangular prism, in substitution for the optical element 102 in FIG. 1.

The first light rays 200 emitted from the optical modulation element 103 in the first direction is reflected by the boundary surface A of the optical element 102R. Further, the light 250 emitted from the light source 101 and the second light rays 201 emitted from the optical modulation element 103 in the second direction are transmitted through the boundary surfaces A and B.

The first light rays 200 reflected by the optical element 102R is directed into the projection unit 104, and then is projected from the projection unit 104 to the projection target. The second light rays 201 transmitted through the optical element 102R are treated as unwanted light. For example, the second light rays 201 strike on the mechanically textured surface or light absorption band so that re-reflection of the second light rays 201 is prevented.

The first light rays 200 emitted from the optical modulation element 103 travel on the opposite side of the second light rays 201 emitted from the optical modulation element 103 across the light rays of the light 250 incident on the optical modulation element 103.

Further, the light 250 emitted from the light source 101 passes through the optical element 102R, and strikes on the optical modulation element 103 (the light 250 is incident on the optical modulation element 103).

With such a configuration, the second light rays 201 are kept away from the first light rays 200, thus substantially preventing the second light rays 201 from entering the projection unit 104. This configuration can increase the difference in the luminance of the projection target between the mode to emit the first light rays 200 from the optical modulation element 103 and another mode to emit the second light rays 201 from the optical modulation element 103.

Further, the light rays of the light 250 incident on the optical modulation element 103 travel between the first light rays 200 emitted from the optical modulation element 103 and the second light rays 201 emitted from the optical modulation element 103. This configuration can provide a compact structure of optical paths and reduce the size of the compact optical element 102R.

By making the same optical element 102R shared between the incident side and the exit side of the optical modulation element 103, a compact optical system 100 is provided.

Figure 11:
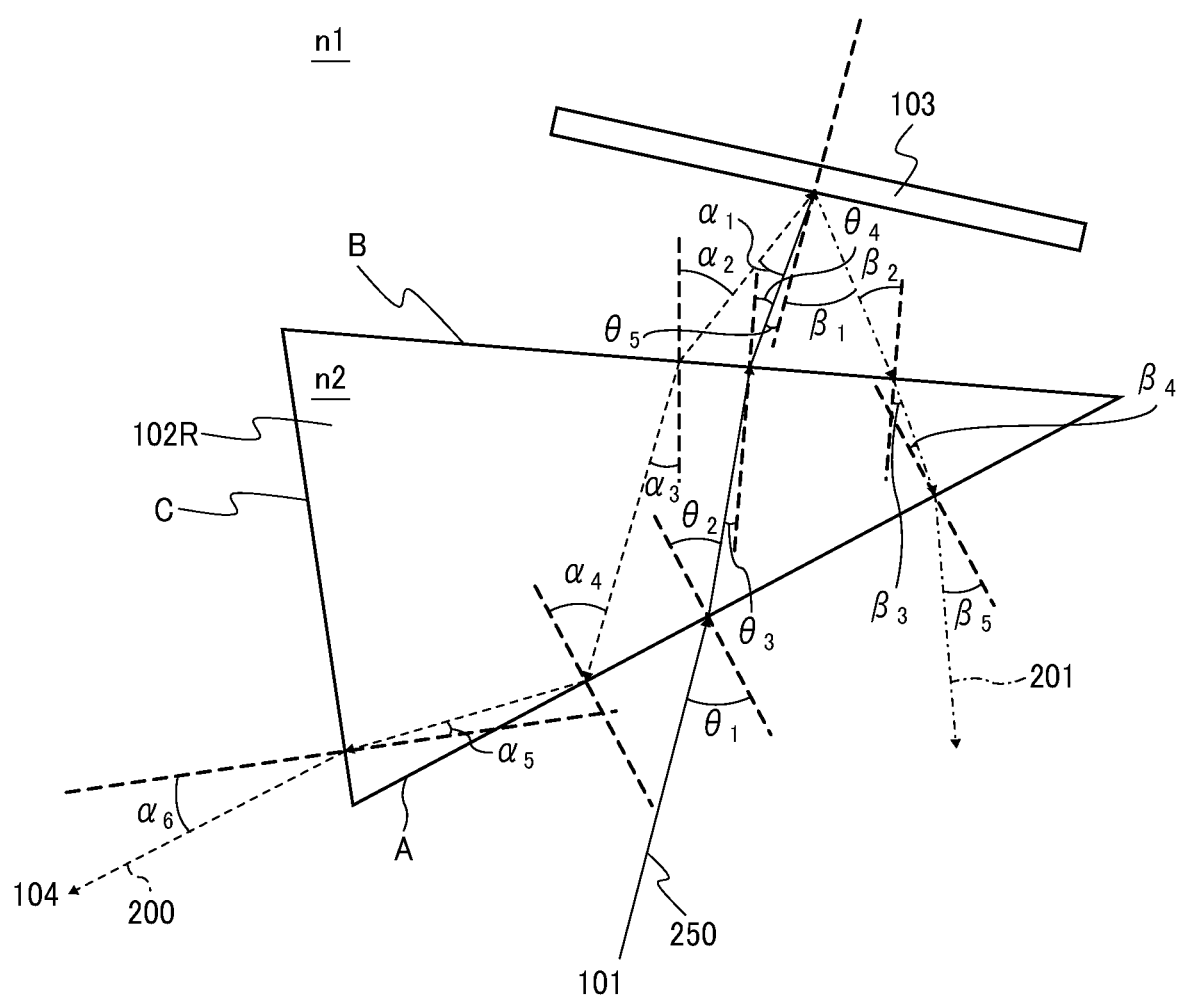
FIG. 11 is a cross-sectional view for describing optical paths of light rays from an optical element and an optical modulation element in FIG. 10.

FIG. 11 is a cross-sectional view for describing optical paths of the light rays of the optical element 102R and the optical modulation element 103 in FIG. 10.

First, the light 250 (indicated by solid lines) emitted from the light source is incident on at an angle (incident angle) of $\theta 1$, and is refracted at an angle of $\theta 2$ by the boundary surface (interface) A between the external environment of a refractive index n1 and the optical element 102R of a refractive index n2. The relation of the incident angle and the reflection angle reflection on the boundary surface A is in accordance with the Snell's law. The relation between the refractive indexes n1 and n2 is n1<n2 (n1 is less than n2).

Light rays having a component of the angle of $\theta 2$ after passing through the boundary surface A reach (strike on) the boundary surface B of the optical element 102R at an angle of $\theta 3$. At this time, the light rays pass through the boundary surface B under the following condition when $\theta c$ denotes the critical angle of the total reflection condition: $\theta 3 < \theta c$: $\theta c$ [=arcsin(n1/n2) {n1<n2}])

The light beam transmitted through the boundary surface B is emitted to the external environment at a refraction angle of $\theta 4$. Then, the light rays strike on the surface of the optical modulation element 103 at an angle of $\theta 5$, thus entering the optical modulation element 103 as the (incident) light 250. Subsequently, the incident light 250 is reflected and modulated by the optical modulation element 103.

The light modulated by the optical modulation element 103 is classified at least into the first light rays 200 emitted in $\alpha$ direction (first direction) and the second light rays 201 emitted in $\beta$ direction (second direction). The first light rays 200 are directed to the projection unit 104 as needed light, and the second light rays 201 are directed to a position different from the position of the projection unit 104 as unwanted light.

The first light rays 200 indicated by broken lines are reflected by the optical modulation element 103 so as to form an angle $\alpha 1$ relative to the normal of the surface of the optical modulation element 103. Then, the first light rays 200 are incident on the boundary surface B at an angle (incident angle) of $\alpha 2$, and refracted at an angle (refraction angle) of $\alpha 3$, proceeding within the optical element 102R.

Subsequently, the first light rays 200 strike on the boundary surface A at an angle $\alpha 4$ greater than or equal to $\theta c$ ($\alpha 4 \geq \theta c$), and is totally reflected by the boundary surface A, traveling toward the boundary surface C.

The first light rays 200 exits the boundary surface C at a refraction angle of $\alpha 6$ to the external environment, and is directed into the projection unit 104.

By contrast, the second light rays 201 are reflected by the optical modulation element 103 so as to form an angle $\beta 1$ relative to the normal of the surface of the optical modulation element 103. Then, the second light rays 201 are incident on the boundary surface B at an angle (incident angle) of $\beta 2$, and refracted by the optical element 102R at an angle (refraction angle) of $\beta 3$, proceeding within the optical element 102R.

Subsequently, the second light rays 201 reach the boundary surface A at an angle of $\beta 4$ less than $\theta c$ ($\beta 4 < \theta c$), and exit the optical element 102R at an angle (refraction angle) of $\beta 5$ to the external environment.

Assuming that the refractive index n1 of the external environment is 1.00 and the refractive index n2 of the optical element 102 is 1.59, specific example values of various parameters are as follows.

$\theta c = 38.9$ {=arcsin(1.00/1.59)}
$\theta 1 = 46.0$
$\theta 2 = 26.9$
$\theta 3 = 3.1$ {<$\theta c$}
$\theta 4 = 5.0$
$\theta 5 = 5.0$
$\alpha 1 = 29.0$
$\alpha 2 = 29.0$
$\alpha 3 = 17.7$
$\alpha 4 = 47.7$ {$\geq \theta c$}
$\alpha 5 = 12.3$
$\alpha 6 = 19.8$
$\beta 1 = 19.0$
$\beta 2 = 19.0$
$\beta 3 = 11.8$
$\beta 4 = 18.2$ {<$\theta c$}
$\beta 5 = 29.8$ With the above-described configuration, the first light rays 200 as needed light is separated from the second light rays 201 as unwanted light, with respect to the boundary surface A of the optical element 102R. Thus, the second light rays 201 are kept away from the first light rays 200.

Further, the light rays of the light 250 incident on the optical modulation element 103 travel between the first light rays 200 emitted from the optical modulation element 103 and the second light rays 201 emitted from the optical modulation element 103. This configuration can provide a compact structure of optical paths and reduce the size of the compact optical element 102R.

By making the same optical element 102R shared between the incident side and the exit side of the optical modulation element 103, a compact optical system 100 is provided.

Further, the boundary surface A of the optical element 102R reflects the first light rays 200 and transmits the second light rays 201 and the light 250 emitted from the light source 101, that is, the reflection and transmission of light occur on the same boundary surface. Accordingly, the second light rays 201 and the emitted light 250 travel at the same side relative to the first light rays 200. This configuration provides a compact optical element 102R and a compact optical system 100.

In the optical system 100 according to the present embodiment, without any specific features on the boundary surfaces, the light emitted from the light source 101 may be directed into the optical modulation element 103 without passing through the optical elements 102 and 102R. In this case, the optical modulation element 103 may be a transmission optical modulation element capable of transmitting the incident light so as to emit the transmitted light in the first direction and the second direction different from the first direction. Further, the light source 101 in the present embodiment is not limited to the LD and the LED, and any other light emitting element such as an organic EL element may be used.

Figure 12:
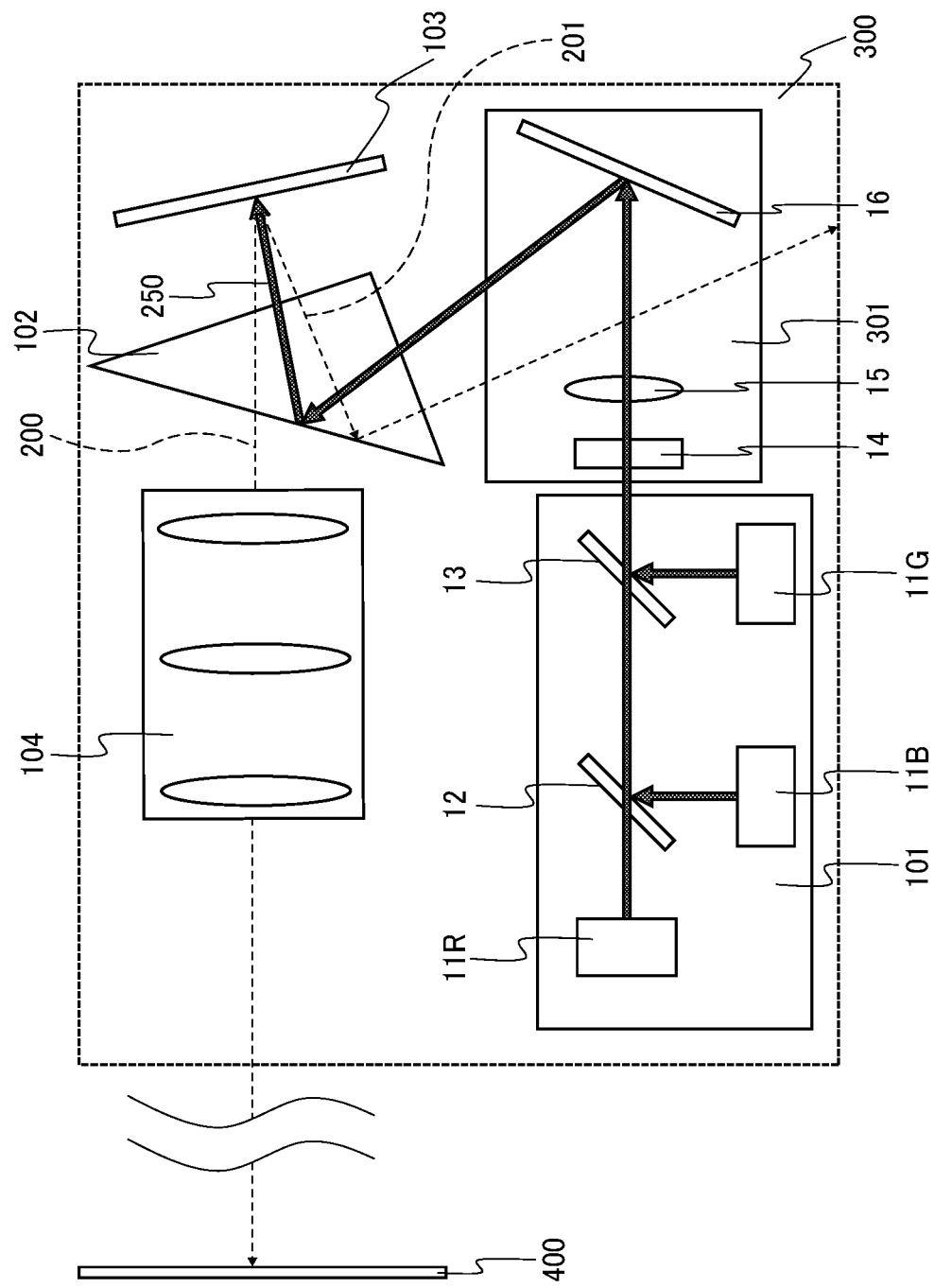
FIG. 12 is a cross-sectional view of an image projection apparatus according to an embodiment.

FIG. 12 is a cross-sectional view of an image projection apparatus 300 according to an embodiment.

The image projection apparatus 300 is a front projection projector, and projects an image on a screen 400. The image projection apparatus 300 is assumed to be mounted on an automobile, but is not limited to this example. The image projection apparatus 300 is available for various uses, and is mountable on a motorcycle, an aircraft, or the like.

The image projection apparatus 300 illustrated in FIG. 12 includes a light source 101, a relay optical system 301, an optical element 102, an optical modulation element 103, and a projection optical system 104.

The light source 101, the optical element 102, the optical modulation element 103, and the projection optical system 104 are configured in the same manner as in the corresponding light source 101, the optical elements 102, 102R, the optical modulation element 103, and the projection optical system 104 illustrated in FIGS. 1 to 12.

The light source 101 includes three-color light sources 11R, 11B, and 11G corresponding to three colors of red (R), blue (B), and green (G), and dichroic mirrors 12 and 13 configured to reflect light of a predetermined wavelength and transmit light of a certain wavelength.

The relay optical system 301 includes a fly-eye lens 14, a condenser lens 15, and a mirror 16, and is configured to direct the light 250 emitted from the light source 101 to the optical element 102.

The optical modulation element 103 modulates the light 250 incident on the optical modulation element 103 based on the image data. The optical modulation element 103 is substantially constituted by a DMD, and processes light into an image based on the image data and reflects processed image light by driving each micromirror in a time-sharing manner based on input image data.

In such a configuration, the light 250 from the relay optical system 301 is reflected by the boundary surface B of the optical element 102, and the reflected light 250 is directed into the optical modulation element 103, thus striking on the optical modulation element 103.

The optical modulation element 103 switches between a mode to reflect the light 250 in the first direction and emitting first light rays 200 and another mode to reflect the light 250 in the second direction and emit second light rays 201 by driving each micromirror in a time-sharing manner. The first light rays 200 emitted from the optical modulation element 103 travel on the opposite side of the second light rays 201 emitted from the optical modulation element 103 across the light rays of the light 250 incident on the optical modulation element 103. The optical element 102 transmits the first light rays 200 emitted from the optical modulation element 103 in the first direction, and reflects the second light rays 201 emitted from the optical modulation element 103 in the second direction at the boundary surface B.

The first light rays 200 transmitted through the optical element 102 are directed as ON light for forming an image based on image data to the projection unit 104. The second light rays 201 transmitted from the optical modulation element 103 in the second direction are treated as OFF light not for forming an image. For example, the second light rays 201 strike on the mechanically textured surface or light absorption band so that re-reflection of the second light rays 201 is prevented.

The projection unit 104 projects the first light rays 200 to a screen 400 to form an image (image formed based on input image data). In some embodiments, the screen 400 may be a multi-layer array (MLA).

With the above-described configuration, the first light rays 200 as ON light for forming an image is clearly separated from the second light rays 201 as OFF light not for forming an image, with respect to the boundary surface B of the optical element 102. Thus, the second light rays 201 are kept away from the first light rays 200.

Accordingly, the second light rays 201 can be substantially prevented from entering the projection unit 104. This configuration can increase the difference in the luminance of the screen 400 between the mode to emit the first light rays 200 from the optical modulation element 103 and another mode to emit the second light rays 201 from the optical modulation element 103. Therefore, the quality of the image projected onto the screen 400 can be enhanced.

Further, the light rays of the light 250 incident on the optical modulation element 103 travel between the first light rays 200 emitted from the optical modulation element 103 and the second light rays 201 emitted from the optical modulation element 103. This configuration can provide a compact structure of optical paths and reduce the size of the compact optical element 102.

Further, the following configurations provide a compact optical system 100: the same optical element 102 is shared between the incident side and the exit side of the optical modulation element 103; and the light 250 emitted from the light source 101 and the second light rays 201 are reflected by the same boundary surface B of the optical element 102.

Further, the boundary surface B transmits the first light rays 200 and reflects the second light rays 201 and the light 250 emitted from the light source 101, that is, the reflection and transmission of light occur on the same boundary surface. Accordingly, the second light rays 201 and the emitted light 250 travel at the same side relative to the first light rays 200. This configuration provides a compact optical element 102 and a compact optical system 100.

Figure 13:
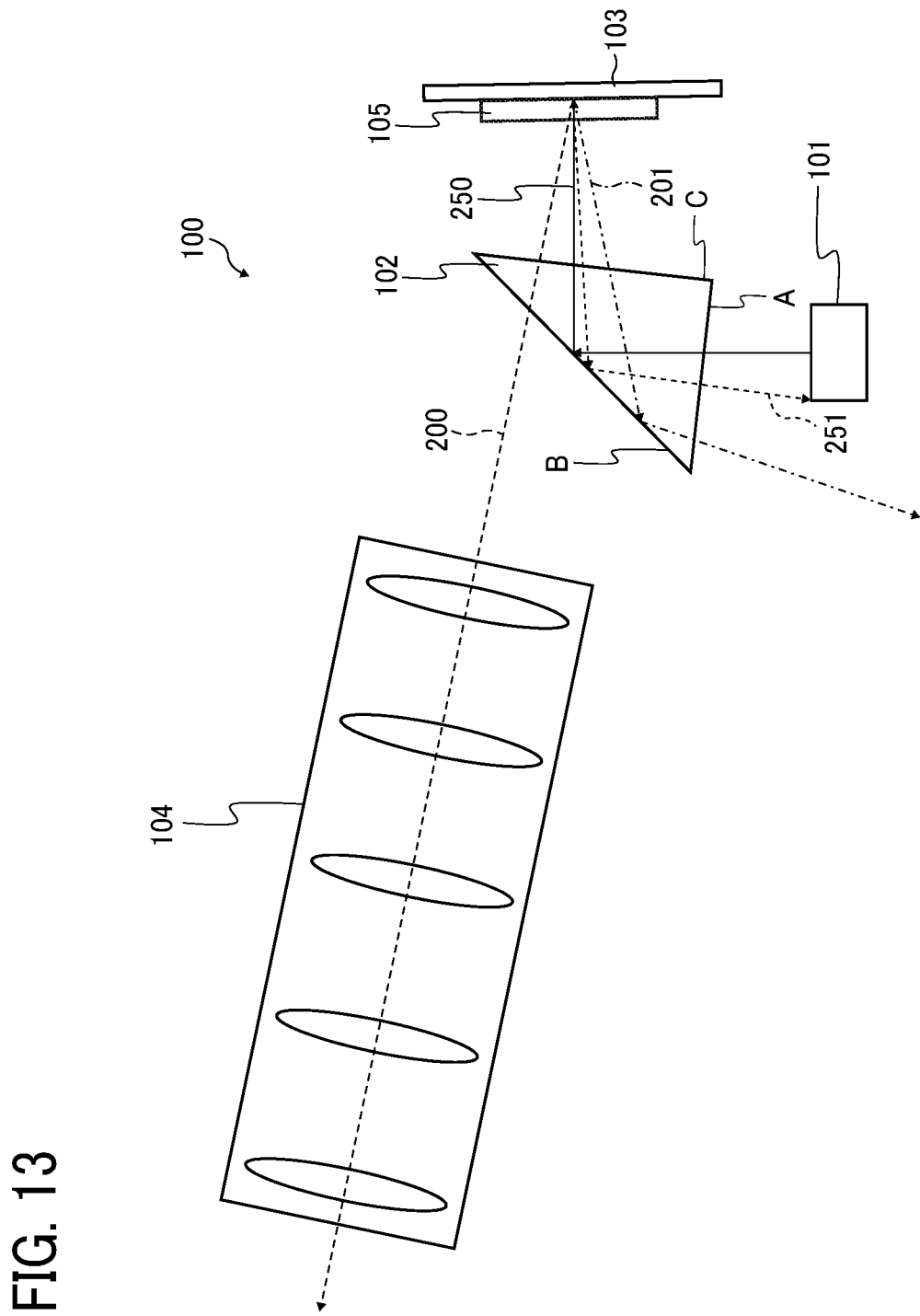
FIG. 13 is a cross-sectional view of an optical system according to a sixth variation of the embodiment in FIG. 1.

FIG. 13 is a cross-sectional view of the optical system 100 according to a sixth variation of the embodiment illustrated in FIG. 1.

The optical system 100 includes a second optical element 105 disposed between the optical element 102 and the optical modulation element 103, in addition to the configuration in FIG. 1. The second optical element 105 is substantially constituted by a cover glass disposed in parallel with the surface (board) of the optical modulation element 103. The second optical element 105 is configured to receive the light 250 reflected by the optical element 102 and emit the received light 250 to the optical modulation element 103. The second optical element is further configured to receive and emit the first light rays 200 and the second light rays 201 to the optical element 102.

In the above-described configuration, the optical element 102 reflects the light 250 emitted from the light source 101 at the boundary surface B, and makes the light 250 directed into the second optical element 105 so that the light 250 strikes on the second optical element 105. The second optical element 102 transmits the light 250 reflected by the boundary surface B of the optical element 102, and makes the reflected light 250 directed to the optical modulation element 103 so that the light 250 strikes on the second optical element 105. A part (some light rays) of the light 250 (emitted from the light source 101 and) reflected by the boundary surface B of the optical element 102 is (are) reflected by the surface of the second optical element 105 without passing through the second optical element 105, thus becoming the reflected light 251 (the light rays reflected by the second optical element 105).

The first light rays 200 emitted from the optical modulation element 103 travel on the opposite side of the second light rays 201 emitted from the optical modulation element 103 across the reflected light 251 and the light rays of the light 250 incident on the optical modulation element 103. The second optical element 105 transmits the first light rays 200 and the second light rays 201 emitted from the optical modulation element 103, and emits the transmitted first light rays 200 and second light rays 201 toward the optical element 102.

The optical element 102 transmits the first light rays 200 through the boundary surface B and the boundary surface C, and reflects the reflected light 251 and the second light rays 201 at the boundary surface B.

The first light rays 200 transmitted through the optical element 102 is directed into the projector 104, and then is projected from the projector 104 to the projection target. The reflected light 251 and the second light rays 201 reflected by the optical element 102 are treated as unwanted light. For example, the reflected light 251 and the second light rays 201 strike on the mechanically textured surface or light absorption band so that re-reflection of the reflected light 251 and the second light rays 201 is prevented.

With such a configuration, the reflected light 251 and the second light rays 201 as unwanted light are kept away from the first light rays 200, thus substantially preventing the reflected light 251 and the second light rays 201 from entering the projection unit 104. This configuration can increase the difference in the luminance of the projection target between the mode to emit the first light rays 200 from the optical modulation element 103 and another mode to emit the second light rays 201 from the optical modulation element 103.

Accordingly, even with the projection unit 104 closer to the optical element 102, the unwanted light is substantially prevented from entering the projection unit 104. Thus, it is possible to dispose the projection unit 104 closer to the optical element 102. This arrangement provides a compact optical system 100, and facilitates an increase in magnification power and the angle of view on the projection target.

Further, the light rays of the light 250 incident on the optical modulation element 103 and the reflected light 251 travel between the first light rays 200 emitted from the optical modulation element 103 and the second light rays 201 emitted from the optical modulation element 103. This configuration can provide a compact structure of optical paths and reduce the size of the compact optical element 102.

Further, the following configurations provide a compact optical system 100: the same optical element 102 is shared between the incident side and the exit side of the optical modulation element 103; and the light 250 emitted from the light source 101, the reflected light 251, and the second light rays 201 are reflected by the same boundary surface B of the optical element 102.

Further, the boundary surface B transmits the first light rays 200 and reflects the second light rays 201, the emitted light 250, and the reflected light 251, that is, the reflection and transmission of light occur on the same boundary surface. Accordingly, the second light rays 201, the reflected light 251, and the emitted light 250 travel at the same side relative to the first light rays 200. This configuration provides a compact optical element 102 and a compact optical system 100.

Figure 14:
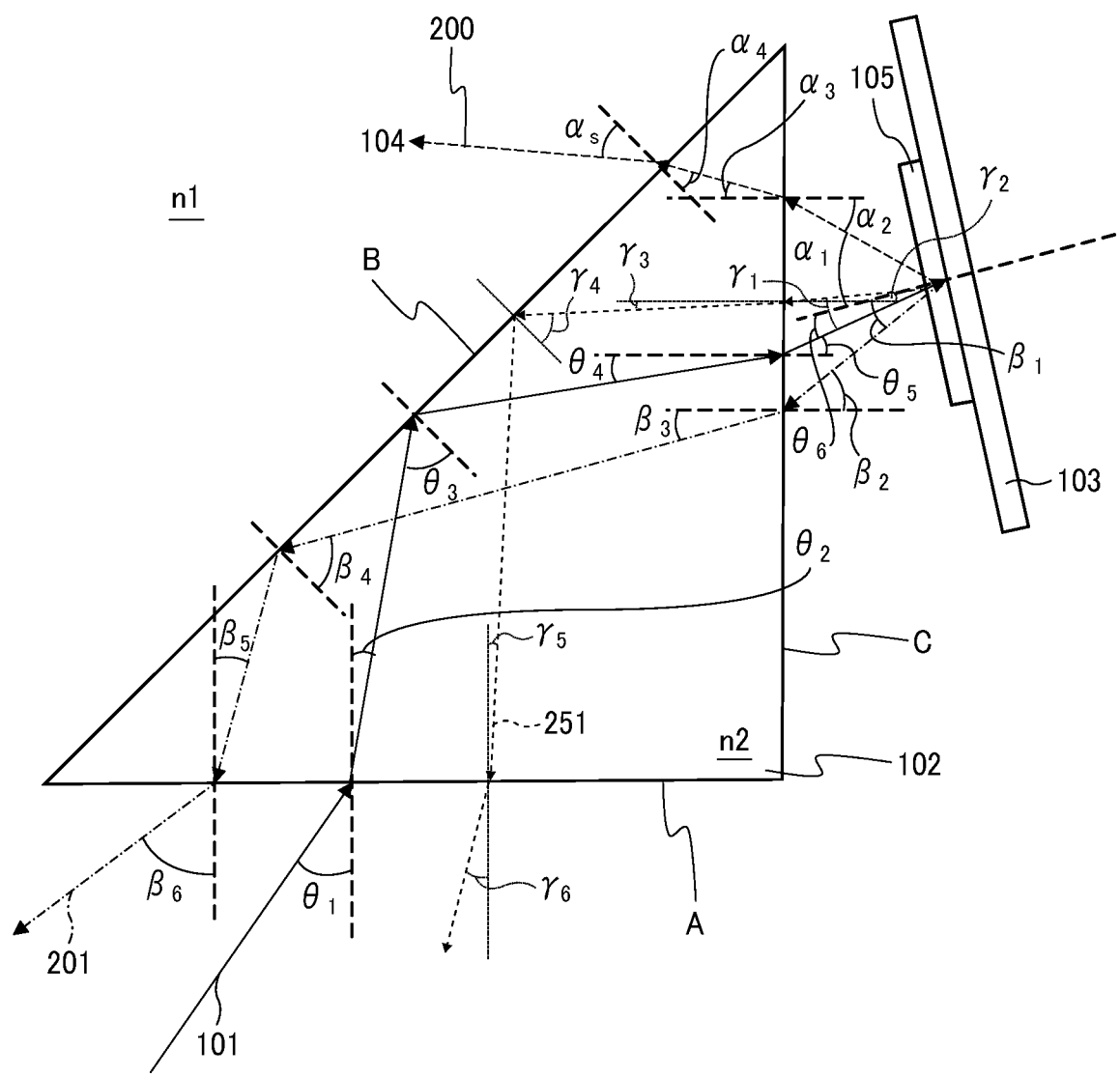
FIG. 14 is a cross-sectional view for describing optical paths of light rays from an optical element, another optical element, and an optical modulation element in FIG. 13.

FIG. 14 is a cross-sectional view for describing optical paths of light rays from the optical element 102, the second optical element 105, and the optical modulation element 103 in FIG. 13.

First, the light 250 (indicated by solid lines) emitted from the light source 101 is incident on at an angle (incident angle) of θ1, and is refracted at an angle of θ2 by the boundary surface (interface) A between the external environment of a refractive index n1 and the optical element 102 of a refractive index n2. The relation between θ1 and θ2 is in accordance with the Snell's law (n2/n1=sin θ1/sin θ2). The relation between the refractive indexes n1 and n2 is n1<n2 (n1 is less than n2).

Light rays having a component of the angle of θ2 after passing through the boundary surface A reach (strike on) the boundary surface B of the optical element 102 at an angle of θ3. At this time, the light rays are totally reflected by boundary surface B under the following condition when θc denotes the critical angle of the total reflection condition: θ3≥θc: θc [=arcsin(n1/n2) {n1<n2}])

The light rays totally reflected by the boundary surface B reach (strike on) the boundary surface (interface) C of the optical element 102 at an angle θ4, and exit the optical element 102 at an angle (refraction angle) of θ5 to the external environment.

Then, the light rays pass through the second optical element 105, and strike on the surface of the optical modulation element 103 at an angle of θ6, thus entering the optical modulation element 103 as the (incident) light 250. Subsequently, the incident light 250 is reflected and modulated by the optical modulation element 103.

The light modulated by the optical modulation element 103 is classified at least into the first light rays 200 emitted in α direction (first direction) and the second light rays 201 emitted in β direction (second direction).

In this case, the (reflected) light 251 reflected by the surface of the second optical element 105 is emitted in γ direction (third direction) without passing through the second optical element 105. The first light rays 200 are directed to the projection unit 104 as needed light, and the second light rays 201 and the reflected light 251 are directed to a position different from the position of the projection unit 104 as unwanted light.

The first light rays 200 indicated by broken lines are reflected by the optical modulation element 103 so as to form an angle $\alpha 1$ relative to the normal of the surface of the optical modulation element 103. Then, the first light rays 200 are incident on the boundary surface C at an angle (incident angle) of $\alpha 2$, and refracted by the optical element 102 at an angle (refraction angle) of $\alpha 3$, proceeding within the optical element 102.

Subsequently, the first light rays 200 reach the boundary surface B at an angle $\alpha 4$ less than $\theta c$ ($\alpha 4 < \theta c$), and exit the optical element 102 at an angle (refraction angle) of $\alpha 5$ to the external environment. Then, the first light rays 200 are directed to the projection unit 104.

By contrast, the second light rays 201 (indicated by one-dot chain lines) are reflected by the optical modulation element 103 so as to form an angle of $\beta 1$ relative to the normal of the surface of the optical modulation element 103. The second light rays 201 travel on the opposite side of the first light rays 200 across the light rays of the light 250 incident on the optical modulation element 103.

The second light rays 201 strike on the boundary surface C at an angle (incident angle) of $\beta 2$, and are refracted by the optical element 102 at an angle (refraction angle) of $\beta 3$, proceeding through the optical element 102. Then, the second light rays 201 reach the boundary surface B at an angle of $\beta 4$ greater than or equal to $\theta c$ ($\beta 4 \geq \theta c$), and are totally reflected by boundary surface B. Then, the second light rays 201 are directed to the boundary surface A, and exits the optical element 102 through the boundary surface A at an angle of (refraction angle) of $\beta 6$ to the external environment.

The second light rays 201 strike on the mechanically textured surface or light absorption band, for example, so that re-reflection of the second light rays 201 is prevented.

The light is reflected as reflected light 251 by the surface of the second optical element 105 at a reflection angle of $\gamma 1$. Subsequently, the reflected light 251 is incident on the boundary surface C at an incident angle of $\gamma 2$, and travels through the optical element 102 at a refraction angle of $\gamma 3$. The reflected light 251 reaches the boundary surface B at an angle $\gamma 4$ greater than or equal to $\theta c$ ($\gamma 4 \geq \theta c$), and is totally reflected by the boundary surface B, traveling toward the boundary surface A.

Then, the reflected light 251 strikes on the boundary surface A at an angle of $\gamma 5$, and exits through the boundary surface A to the external environment at an angle (refraction angle) of $\gamma 6$. Same as the second light rays 201, the reflected light 251 strikes on the mechanically textured surface or light absorption band, for example, so that re-reflection of the reflected light 251 is prevented.

Assuming that the refractive index n1 of the external environment is 1.00, the refractive index n2 of the optical element 102 is 1.64, and the adjustment angle on one side of the optical modulation element 103 is 12 degrees, specific example values of various parameters are as follows.

$\theta c = 37.6$ {$= \arcsin(1.00/1.6)$}
$\theta 1 = 0$
$\theta 2 = 0$
$\theta 3 = 45.0$ {$\geq \theta c$}
$\theta 4 = 0$
$\theta 5 = 0$
$\theta 6 = 0$
$\alpha 1 = 24.0$
$\alpha 2 = 24.0$
$\alpha 3 = 14.3$
$\alpha 4 = 30.7$ {$< \theta c$}
$\alpha 5 = 56.9$
$\beta 1 = 24.0$
$\beta 2 = 24.0$
$\beta 3 = 14.3$
$\beta 4 = 59.3$ {$\geq \theta c$}
$\beta 5 = 14.3$
$\beta 6 = 24.0$
$\gamma 1 = 0$
$\gamma 2 = 0$
$\gamma 3 = 0$
$\gamma 4 = 45.0$ {$\geq \theta c$}
$\gamma 5 = 0$
$\gamma 6 = 0$ If the incident angle relative to the boundary surface B is the same as the above-described value, and the conditions for the transmission through and the total reflection on the boundary surface B are satisfied, any other unwanted light such as light reflected or scattered by a surface of other element other than the second optical element 105 is eliminated.

With the above-described configuration, the first light rays 200 as needed light is clearly separated from the reflected light 251 and the second light rays 201 as unwanted light, with respect to the boundary surface B of the optical element 102. Thus, the reflected light 251 and the second light rays 201 are kept away from the first light rays 200.

Accordingly, the reflected light 251 and the second light rays 201 can be substantially prevented from entering the projection unit 104. This configuration can increase the difference in the luminance of the projection target between the mode to emit the first light rays 200 from the optical modulation element 103M and another mode to emit the second light rays 201 from the optical modulation element 103M.

Accordingly, even with the projection unit 104 closer to the optical element 102, the unwanted light is substantially prevented from entering the projection unit 104. Thus, it is possible to dispose the projection unit 104 closer to the optical element 102. This arrangement provides a compact optical system 100, and facilitates an increase in magnification power and the angle of view on the projection target.

Further, the light rays of the light 250 incident on the optical modulation element 103 and the reflected light 251 travel between the first light rays 200 emitted from the optical modulation element 103 and the second light rays 201 emitted from the optical modulation element 103. This configuration can provide a compact structure of optical paths and reduce the size of the compact optical element 102.

Further, the following configurations provide a compact optical system 100: the same optical element 102 is shared between the incident side and the exit side of the optical modulation element 103; and the light 250 emitted from the light source 101, the reflected light 251, and the second light rays 201 are reflected by the same boundary surface B of the optical element 102.

Further, the boundary surface B transmits the first light rays 200 and reflects the second light rays 201, the emitted light 250, and the reflected light 251, that is, the reflection and transmission of light occur on the same boundary surface. Accordingly, the second light rays 201, the reflected light 251, and the emitted light 250 travel at the same side relative to the first light rays 200. This configuration provides a compact optical element 102 and a compact optical system 100.

The optical system 100 in FIGS. 13 and 14 includes a light source 101E including an LED light source optical system as illustrated in FIG. 4, in substitution for the light source 101 including an LD in FIG. 1. The following describes the case in which such an optical system 100 is used.

Assuming that the refractive index n1 of the external environment is 1.00, the refractive index n2 of the optical element 102 is 1.64, and the adjustment angle on one side of the optical modulation element 103 is 12 degrees, specific example values of various parameters for the principal ray 120 are as follows.

$\theta c$=37.6 {=arcsin(1.00/1.64)}
$\theta 1$=0
$\theta 2$=0
$\theta 3$=45.0 {≥$\theta c$}
$\theta 4$=0
$\theta 5$=0
$\theta 6$=0
$\alpha 1$=24.0
$\alpha 2$=24.0
$\alpha 3$=14.3
$\alpha 4$=30.7 {<$\theta c$}
$\alpha 5$=56.9
$\beta 1$=24.0
$\beta 2$=24.0
$\beta 3$=14.3
$\beta 4$=59.3 {≥$\theta c$}
$\beta 5$=14.3
$\beta 6$=24.0
$\gamma 1$=0
$\gamma 2$=0
$\gamma 3$=0
$\gamma 4$=45.0 {≥$\theta c$}
$\gamma 5$=0
$\gamma 6$=0

Since the upper light ray 121 corresponds to light incident on the optical element 102 at an angle of 10 degrees, specific example values of various parameters in the upper light ray 121 are as follows.

$\theta 1$=10.0
$\theta 2$=6.1
$\theta 3$=38.9 {≥$\theta c$}
$\theta 4$=6.1
$\theta 5$=10.0
$\theta 6$=10.0
$\alpha 1$=14.0
$\alpha 2$=14.0
$\alpha 3$=8.5
$\alpha 4$=36.5 {<$\theta c$}
$\alpha 5$=80.0
$\beta 1$=34.0
$\beta 2$=34.0
$\beta 3$=19.9
$\beta 4$=64.9 {≥$\theta c$}
$\beta 5$=19.9
$\beta 6$=34.0
$\gamma 1$=10.0
$\gamma 2$=10.0
$\gamma 3$=6.1
$\gamma 4$=51.1 {≥$\theta c$}
$\gamma 5$=6.1
$\gamma 6$=10.0

Same as the upper light ray 121, the lower light ray 122 has the following specific example values of various parameters.

$\theta 1$=10.0
$\theta 2$=6.1
$\theta 3$=51.1 {≥$\theta c$}
$\theta 4$=6.1
$\theta 5$=10.0
$\theta 6$=10.0
$\alpha 1$=34.0
$\alpha 2$=34.0
$\alpha 3$=19.9
$\alpha 4$=25.1 {<$\theta c$}
$\alpha 5$=44.2
$\beta 1$=14.0
$\beta 2$=14.0
$\beta 3$=8.5
$\beta 4$=53.5 {≥$\theta c$}
$\beta 5$=8.5
$\beta 6$=14.0
$\gamma 1$=10.0
$\gamma 2$=10.0
$\gamma 3$=6.1
$\gamma 4$=38.9 {≥$\theta c$}
$\gamma 5$=6.1
$\gamma 6$=10.0

If the incident angle relative to the boundary surface B is the same as the above-described value, and the conditions for the transmission through and the total reflection on the boundary surface B are satisfied, any other unwanted light such as light reflected or scattered by a surface of other element other than the second optical element 105 is eliminated.

In the present embodiment, since the adjustment angle of the optical modulation element 103 is 12 degrees on one side, the angle formed by the extension of the principal ray 120 of the first light rays 200 and the extension of the principal ray 120 of the reflected light 251 is 24 degrees (the half angle is 12 degrees). The angle formed by the principal light ray 120 and the upper light ray 121 or the lower light rays 122 of each of the first light rays 200 and the reflected light 251 is 10 degrees.

The angle formed by the principal light ray 120 and the upper light ray 121 or the lower light rays 122 of each of the first light rays 200 and the reflected light 251 may be any other value other than the above-described value as long as the angle is less than or equal to half of the angle formed by the extension of the principal light ray 120 of the first light rays 200 and the extension of the principal light ray 120 of the reflected light 251.

Accordingly, the reflected light 251 as unwanted light is separated from the first light rays 200 as needed light with respect to the boundary surface B of the first optical element 102. Further, the difference in the luminance of the projection target can be increased between the mode to emit the first light rays 200 from the optical modulation element 103 and another mode to emit the second light rays 201 from the optical modulation element 103.

Figure 15:
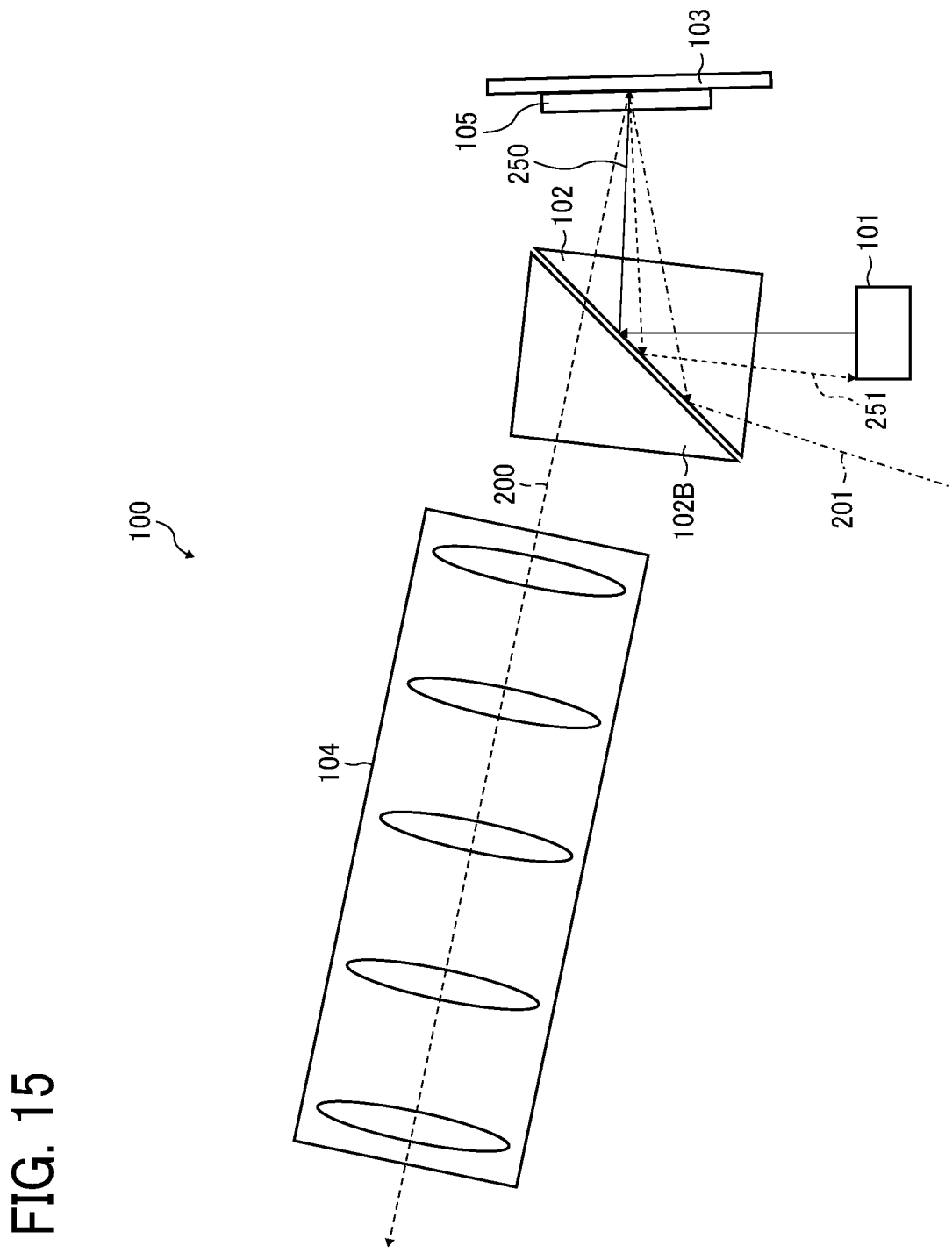
FIG. 15 is a cross-sectional view of an optical system according to a seventh variation of the embodiment in FIG. 1.

FIG. 15 is a cross-sectional view of the optical system 100 according to a seventh variation of the embodiment illustrated in FIG. 1.

The optical system 100 includes an optical element 102B substantially constituted by a triangular prism as illustrated in FIG. 6, in addition to the configuration in FIG. 13 according to the sixth variation of the embodiment illustrated in FIG. 1. The optical element 102B transmits the first light rays 200 that have passed through the optical element 102, and the first light rays 200 transmitted through the optical element 102B are directed into the projection unit 104. Thus, the projection unit 104 projects the first light rays 200 onto the projection target. This facilitates correction of aberrations and adjustment of the emission direction.

Figure 16:
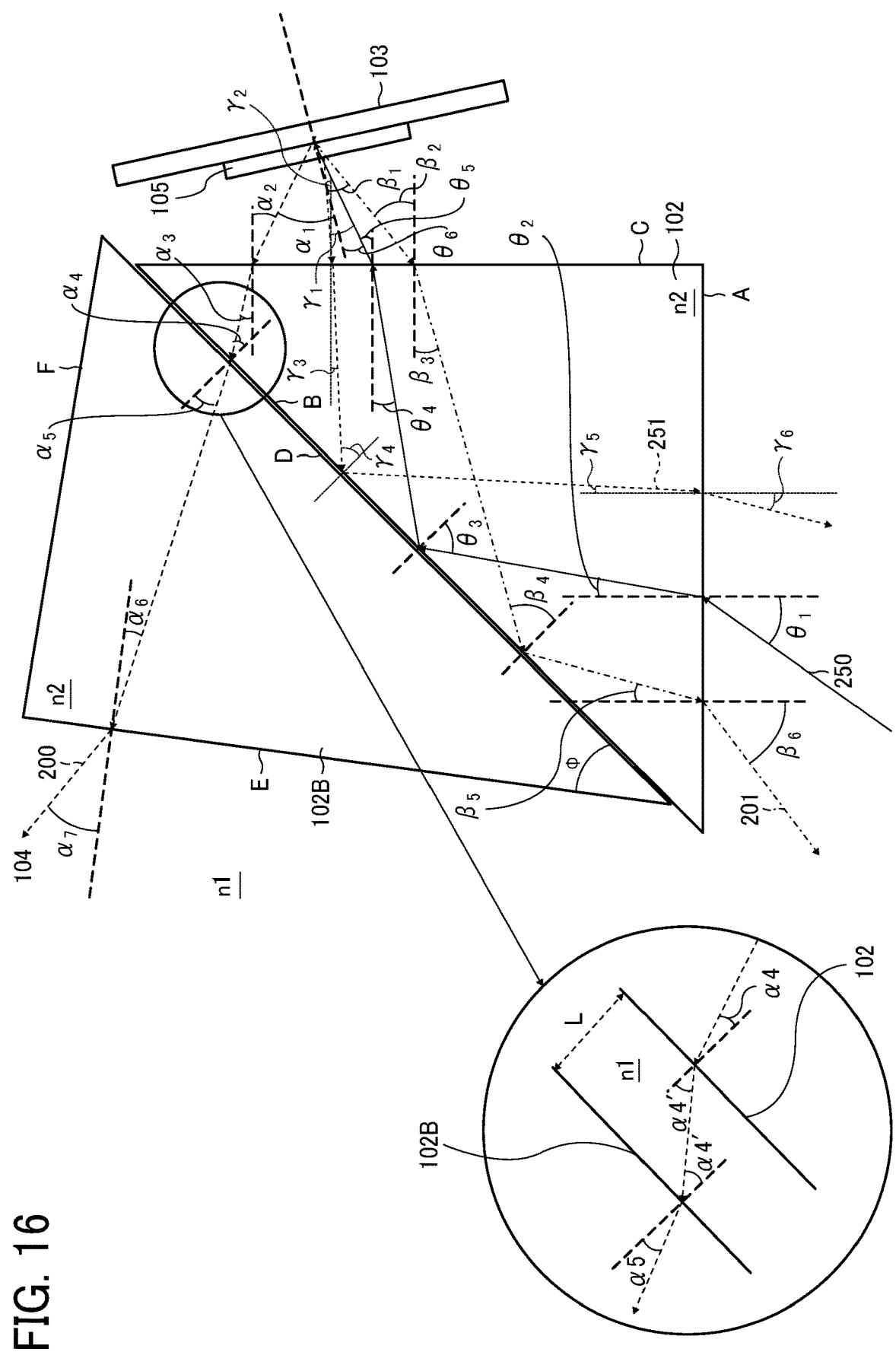
FIG. 16 is a cross-sectional view for describing optical paths of light rays from an optical element, another optical element, still another optical element, and an optical modulation element in FIG. 15.

FIG. 16 is a cross-sectional view for describing optical paths of light rays from the optical element 102, the optical element 102B, the second optical element 105, and the optical modulation element 103 in FIG. 15. In FIG. 16, the circle in the lower left of this figure is an enlarged view of a portion surrounded by the circle in the upper right.

The optical paths of the incident light (emitted light) 250, the second light rays 201, and the reflected light 251 are the same as those in FIG. 14, and thus their description is omitted.

The first light rays 200 indicated by broken lines are reflected by the optical modulation element 103 so as to form an angle $\alpha 1$ relative to the normal of the surface of the optical modulation element 103. Then, the first light rays 200 are incident on the boundary surface C of the optical element 102 at an angle (incident angle) of $\alpha 2$, and refracted by the optical element 102 at an angle (refraction angle) of $\alpha 3$, proceeding within the optical element 102.

Subsequently, the first light rays 200 reach the boundary surface B at an angle of $\alpha 4$ less than $\theta c$ ($\alpha 4 < \theta c$), and exit the optical element 102 at an angle (refraction angle) of $\alpha 4'$ to the external environment. Then, the first light rays 200 strike on the boundary surface (interface) D of the optical element 102B at a refraction angle of $\alpha 4'$. The optical element 102B has a refractive index of n2, and the angle formed by the boundary surface D and the boundary surface E is an angle of $\varphi$.

An air layer having a refractive index of n1 is formed between the optical element 102 and the optical element 102B. The optical element 102 and the optical element 102B are arranged so that the boundary surface B of the optical element 102 and the boundary surface D of the optical element 102B are parallel to each other. Accordingly, the incident angle $\alpha 4$ on the boundary surface B is equal to the refraction angle $\alpha 5$ on the boundary surface D. Increasing the area of the air layer between the optical element 102 and the optical element 102B has a greater effect on a projected image. In view of this, a spacing L between the optical element 102 and the optical element 102B (the length of the air layer) is preferably 10 micrometers (μm) or less.

The first light rays 200 advances within the optical element 102B at a refraction angle of $\alpha 5$, and reaches the boundary surface E of the optical element 102B at an angle of $\alpha 6$ less than $\theta c$ ($\alpha 6 < \theta c$). Then, the first light rays 200 is emitted from the optical element 102B at an angle of $\alpha 7$ to the external environment, and directed to the projection unit 104.

Assuming that the refractive index n1 of the external environment is 1.00, the refractive index n2 of the optical element 102 is 1.64, and the adjustment angle on one side of the optical modulation element 103 is 12 degrees, specific example values of various parameters are as follows.

Figure 17:
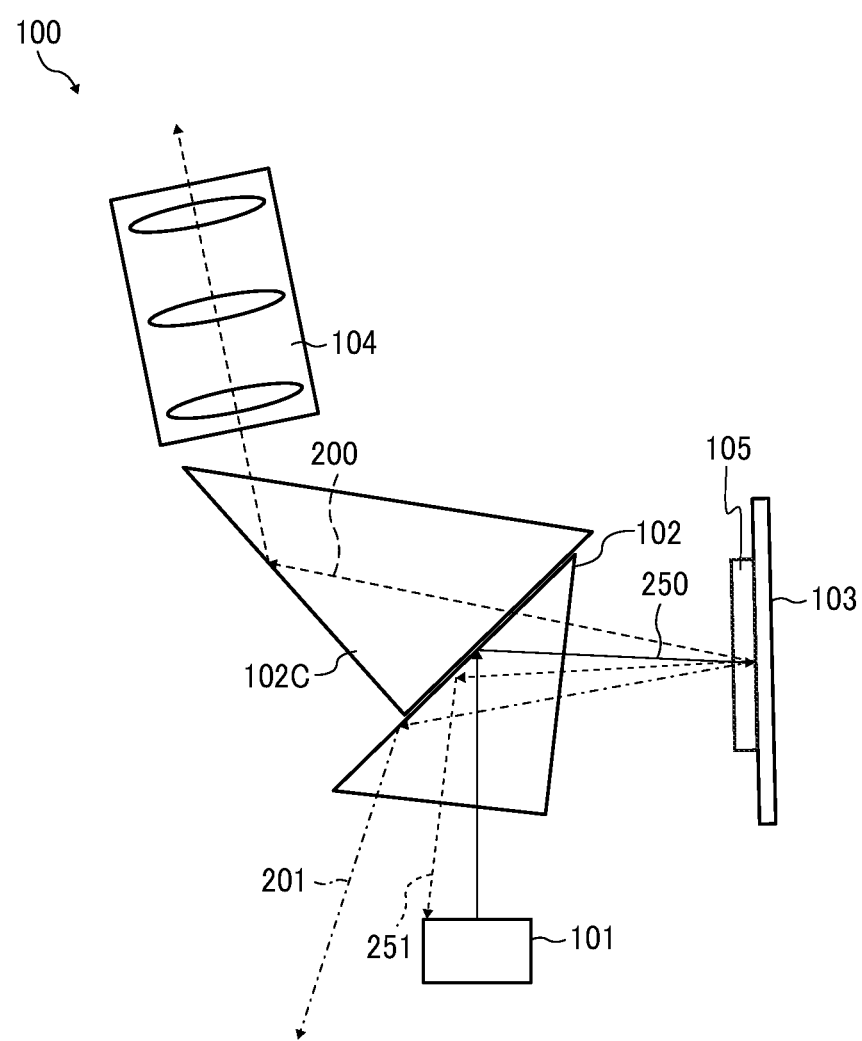
FIG. 17 is a cross-sectional view of an optical system according to an eighth variation of the embodiment in FIG. 1.

$\theta c=37.6$ {=arcsin(1.00/1.64)} $\varphi=30.7$
$\theta 1=0$
$\theta 2=0$
$\theta 3=45.0$ {≥$\theta c$}
$\theta 4=0$
$\theta 5=0$
$\theta 6=0$
$\alpha 1=24.0$
$\alpha 2=24.0$
$\alpha 3=14.3$
$\alpha 4=30.7$ {<$\theta c$}
$\alpha 4'=56.9$
$\alpha 5=30.7$
$\alpha 6=0$ {<$\theta c$}
$\alpha 7=0$
$\beta 1=24.0$
$\beta 2=24.0$
$\beta 3=14.3$
$\beta 4=59.3$ {≥$\theta c$}
$\beta 5=14.3$
$\beta 6=24.0$
$\gamma 1=0$
$\gamma 2=0$
$\gamma 3=0$
$\gamma 4=45.0$ {≥$\theta c$}
$\gamma 5=0$
$\gamma 6=0$ FIG. 17 is a cross-sectional view of the optical system 100 according to an eighth variation of the embodiment illustrated in FIG. 1.

The optical system 100 includes an optical element 102C substantially constituted by a triangular prism as illustrated in FIG. 8, in substitution for the optical element 102B, in the configuration in FIG. 15 according to the seventh variation of the embodiment illustrated in FIG. 1. The optical element 102C reflects the first light rays 200 that have passed through the optical element 102, and the first light rays 200 reflected by the optical element 102C are directed into the projection unit 104. Thus, the projection unit 104 projects the first light rays 200 onto the projection target.

With such a configuration, the second light rays 201 and the reflected light 251 are kept further away from the first light rays 200, thus preventing the second light rays 201 and the reflected light 251 from entering the projection unit 104. This configuration can reliably increase the difference in the luminance of the projection target between when the first light rays 200 are emitted from the optical modulation element 103 and when the second light rays 201 are emitted from the optical modulation element 103.

Figure 18:
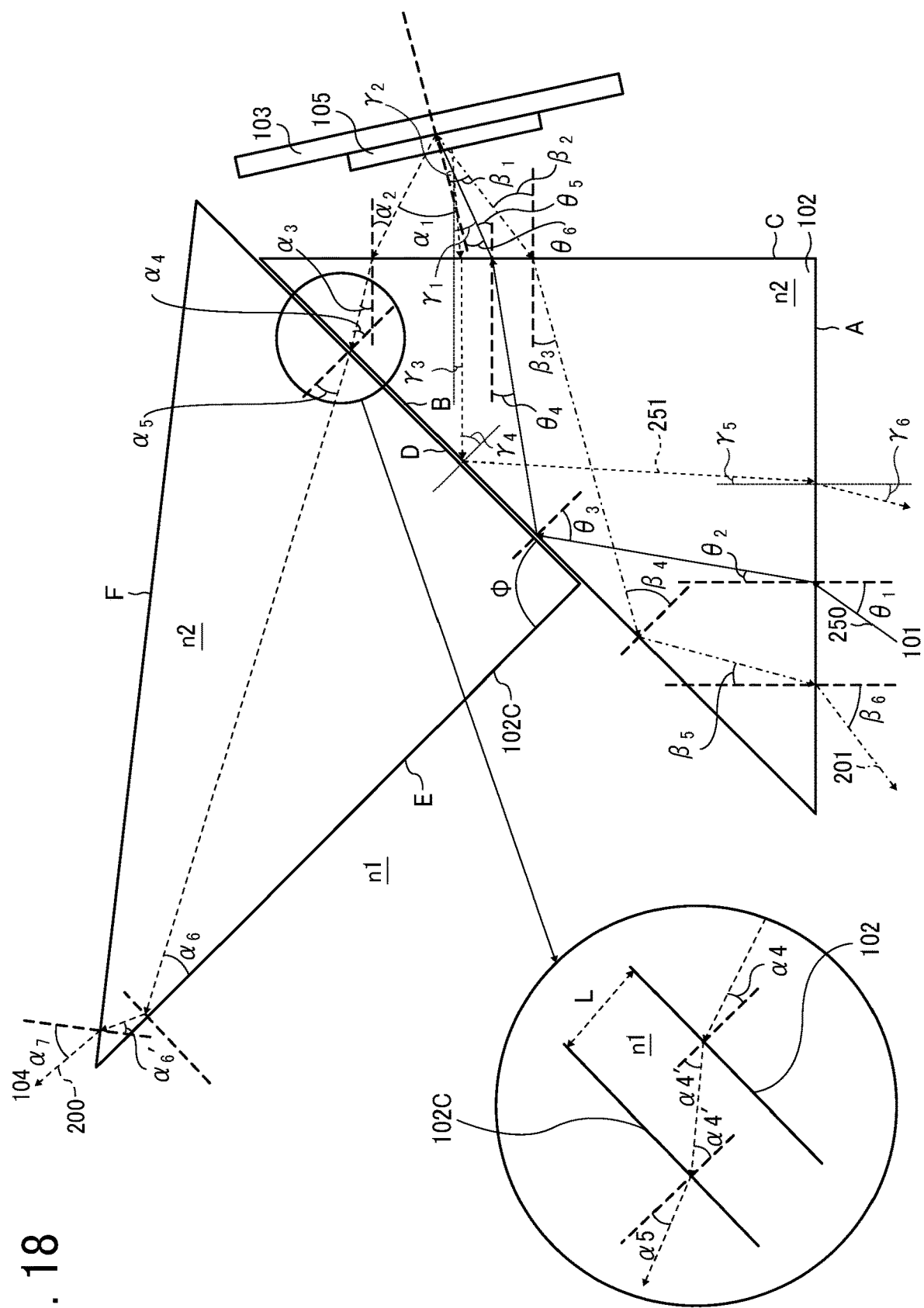
FIG. 18 is a cross-sectional view for describing optical paths of light rays from an optical element, another optical element, still another optical element, and an optical modulation element in FIG. 17.

FIG. 18 is a cross-sectional view for describing optical paths of light rays of the optical element 102, the optical element 102C, the second optical element 105, and the optical modulation element 103 in FIG. 17. In FIG. 18, the circle in the lower left of this figure is an enlarged view of a portion surrounded by the circle in the upper right.

The optical paths of the incident light (emitted light) 250, the second light rays 201, and the reflected light 251 are the same as those in FIG. 14, and thus their description is omitted.

The first light rays 200 indicated by broken lines are reflected by the optical modulation element 103 so as to form an angle $\alpha 1$ relative to the normal of the surface of the optical modulation element 103. Then, the first light rays 200 are incident on the boundary surface C of the optical element 102 at an angle (incident angle) of $\alpha 2$, and refracted by the optical element 102 at an angle (refraction angle) of $\alpha 3$, proceeding within the optical element 102.

Subsequently, the first light rays 200 reach the boundary surface B at an angle of $\alpha 4$ less than $\theta c$ ($\alpha 4 < \theta c$), and exit the optical element 102 at an angle (refraction angle) of $\alpha 4'$ to the external environment. Then, the first light rays 200 strike on the boundary surface (interface) D of the optical element 102C at a refraction angle of $\alpha 4'$. The optical element 102C has a refractive index of n2, and the angle formed by the boundary surface D and the boundary surface E is an angle of $\varphi$.

An air layer having a refractive index of n1 is formed between the optical element 102 and the optical element 102C. The optical element 102 and the optical element 102C are arranged so that the boundary surface B of the optical element 102 and the boundary surface D of the optical element 102C are parallel to each other. Accordingly, the incident angle of α4 on the boundary surface B is equal to the refraction angle of α5 on the boundary surface D. Increasing the area of the air layer between the optical element 102 and the optical element 102C has a greater effect on a projected image. In view of this, a spacing L between the optical element 102 and the optical element 102C (the length of the air layer) is preferably 10 micrometers (μm) or less.

The first light rays 200 advance within the optical element 102C at a refraction angle of α5, and reaches the boundary surface E of the optical element 102C at an angle of α6 greater than or equal to θc (α6≥θc). Subsequently, the first light rays 200 are totally reflected by the boundary surface E, and strike on the boundary surface F at an angle of α6', exiting the optical element 102C at a refraction angle of α' to the external environment. Thus, the first light rays 200 are directed into the projection unit 104, thus entering the projection unit 104.

Assuming that the refractive index n1 of the external environment is 1.00, the refractive index n2 of the optical element 102 is 1.64, and the adjustment angle on one side of the optical modulation element 103 is 12 degrees, specific example values of various parameters are as follows.

θc=37.6 {=arcsin(1.00/1.64)} φ=90.0
θ1=0
θ2=0
θ3=45.0 {≥θc}
θ4=0
θ5=0
θ6=0
α1=24.0
α2=24.0
α3=14.3
α4=30.7 {<θc}
α4'=56.9
α5=30.7
α6=59.3 {≥θc}
α6'=9.3
α7=15.5
β1=24.0
β2=24.0
β3=14.3
β4=59.3 {≥θc}
β5=14.3
β6=24.0
γ1=0
γ2=0
γ3=0
γ4=45.0 {≥θc}
γ5=0
γ6=0

With such a configuration, the second light rays 201 and the reflected light 251 are kept further away from the first light rays 200.

Figure 19:
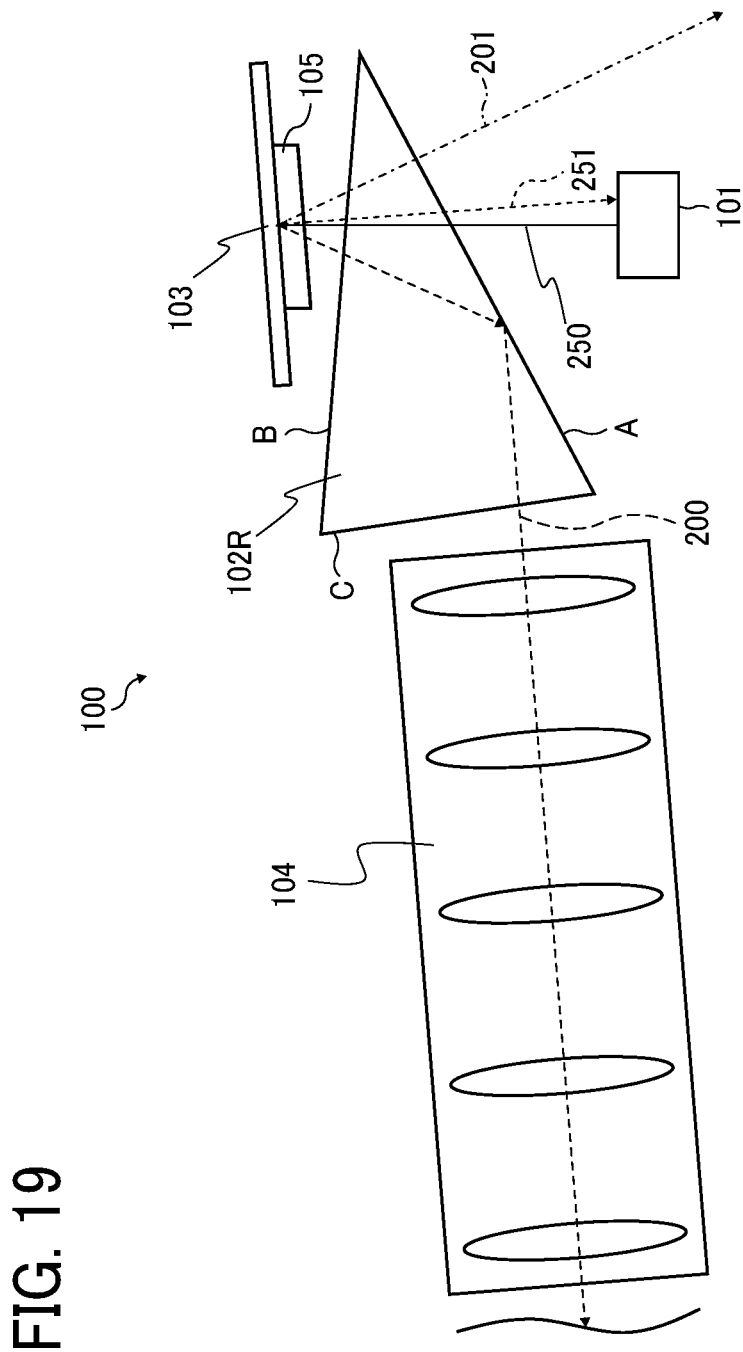
FIG. 19 is a cross-sectional view of an optical system according to a ninth variation of the embodiment in FIG. 1.

FIG. 19 is a cross-sectional view of the optical system 100 according to a ninth variation of the embodiment illustrated in FIG. 1.

The optical system 100 includes an optical element 102R substantially constituted by a triangular prism same as in FIG. 10, in substitution for the optical element 102, in the configuration in FIG. 13 according to the sixth variation of the embodiment illustrated in FIG. 1.

The optical element 102R reflects the first light rays 200 at the boundary surface A, and transmits the reflected light 251, the second light rays 201, and the light 250 emitted from the light source 101 through the boundary surfaces A and B.

The first light rays 200 reflected by the optical element 102R is directed into the projection unit 104, and then is projected from the projection unit 104 to the projection target. The reflected light 251 and the second light rays 201 transmitted through the optical element 102R are treated as unwanted light. For example, the second light rays 201 strike on the mechanically textured surface or light absorption band so that re-reflection of the reflected light 251 and the second light rays 201 is prevented.

The first light rays 200 emitted from the optical modulation element 103 travel on the opposite side of the second light rays 201 emitted from the optical modulation element 103 across the light rays of the light 250 incident on the optical modulation element 103.

Further, the light 250 emitted from the light source 101 passes through the optical element 102R, and strikes on the optical modulation element 103 (the light 250 is incident on the optical modulation element 103 as incident light 250).

With such a configuration, the reflected light 251 and the second light rays 201 as unwanted light are kept away from the first light rays 200, thus substantially preventing the reflected light 251 and the second light rays 201 from entering the projection unit 104. This configuration can increase the difference in the luminance of the projection target between the mode to emit the first light rays 200 from the optical modulation element 103 and another mode to emit the second light rays 201 from the optical modulation element 103.

Accordingly, even with the projection unit 104 closer to the optical element 102, the unwanted light is substantially prevented from entering the projection unit 104. Thus, it is possible to dispose the projection unit 104 closer to the optical element 102. This arrangement provides a compact optical system 100, and facilitates an increase in magnification power and the angle of view on the projection target.

Further, the light rays of the light 250 incident on the optical modulation element 103 and the reflected light 251 travel between the first light rays 200 emitted from the optical modulation element 103 and the second light rays 201 emitted from the optical modulation element 103. This configuration can provide a compact structure of optical paths and reduce the size of the compact optical element 102R.

By making the same optical element 102R shared between the incident side and the exit side of the optical modulation element 103, a compact optical system 100 is provided.

Figure 20:
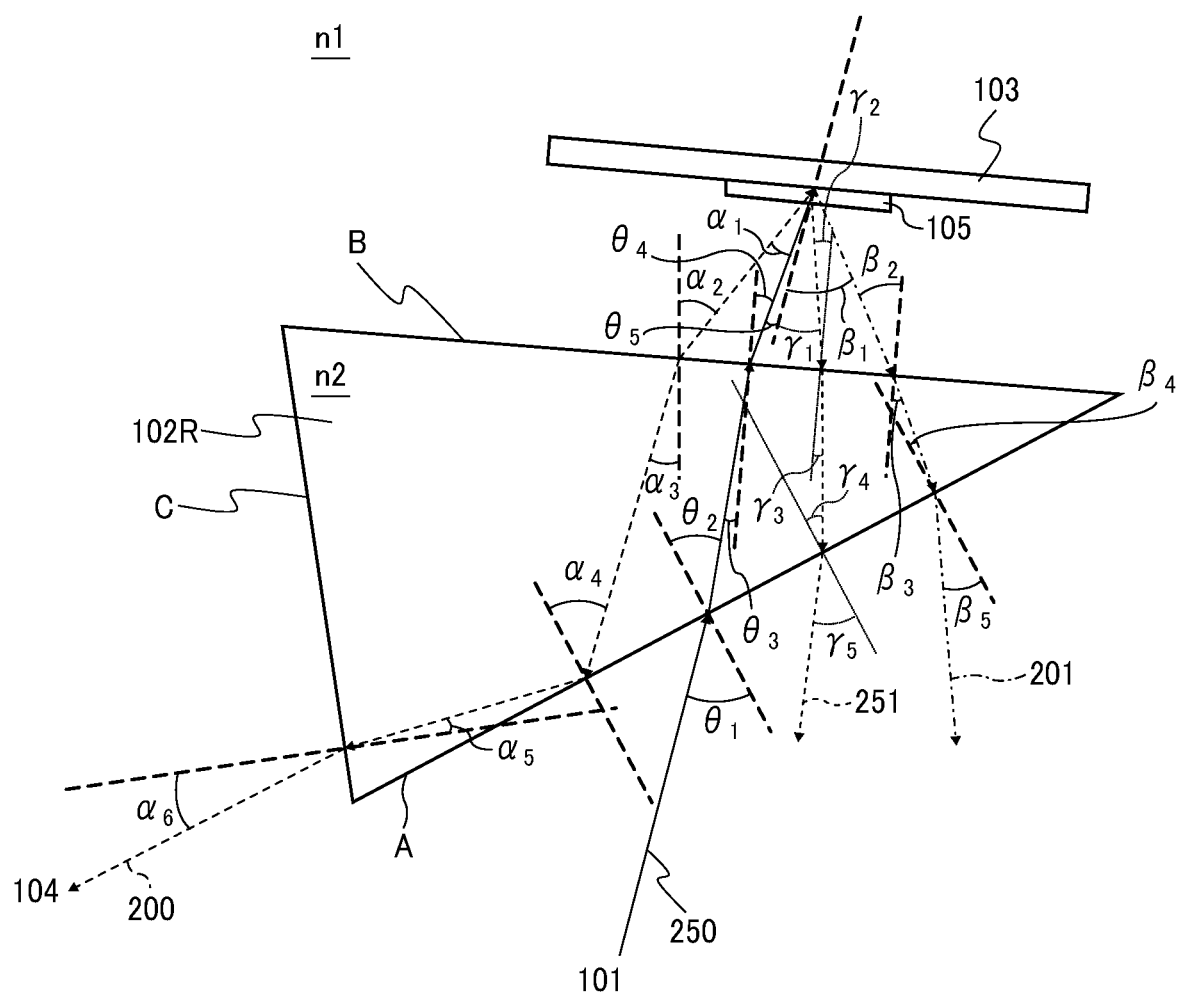
FIG. 20 is a cross-sectional view for describing optical paths of light rays from an optical element, another optical element, and an optical modulation element in FIG. 19.

FIG. 20 is a cross-sectional view for describing optical paths of light rays from the optical element 102R, the second optical element 105, and the optical modulation element 103 in FIG. 19.

First, the light 250 (indicated by solid lines) emitted from the light source is incident on at an angle (incident angle) of θ1, and is refracted at an angle of θ2 by the boundary surface (interface) A between the external environment of a refractive index n1 and the optical element 102R of a refractive index n2. The relation of the incident angle and the reflection angle on the boundary surface A is in accordance with the Snell's law. The relation between the refractive indexes n1 and n2 is n1<n2 (n1 is less than n2).

Light rays having a component of the angle of θ2 after passing through the boundary surface A reach (strike on) the boundary surface B of the optical element 102R at an angle of θ3. At this time, the light rays pass through the boundary surface B under the following condition when θc denotes the critical angle of the total reflection condition: θ3<θc: θc [=arcsin(n1/n2) {n1<n2}])

The light rays that has passed through the boundary surface B is emitted to the external environment at a refraction angle of θ4. Then, the light rays pass through the second optical element 105, and strike on the surface of the optical modulation element 103 at an angle of θ5, thus entering the optical modulation element 103 as the (incident) light 250. Subsequently, the incident light 250 is reflected and modulated by the optical modulation element 103.

The light modulated by the optical modulation element 103 is classified at least into the first light rays 200 emitted in α direction (first direction) and the second light rays 201 emitted in β direction (second direction).

In this case, the (reflected) light 251 reflected by the surface of the second optical element 105 is emitted in γ direction (third direction) without passing through the second optical element 105. The first light rays 200 are directed to the projection unit 104 as needed light, and the second light rays 201 and the reflected light 251 are directed to a position different from the position of the projection unit 104 as unwanted light.

The first light rays 200 indicated by broken lines are reflected by the optical modulation element 103 so as to form an angle α1 relative to the normal of the surface of the optical modulation element 103. Then, the first light rays 200 are incident on the boundary surface B at an angle (incident angle) of α2, and refracted at an angle (refraction angle) of α3, proceeding within the optical element 102R.

Subsequently, the first light rays 200 strike on the boundary surface A at an angle α4 greater than or equal to θc (α4≥θc), and are totally reflected by the boundary surface A, traveling toward the boundary surface C.

The first light rays 200 exits the boundary surface C at a refraction angle of α6 to the external environment, and is directed into the projection unit 104, thus entering the projection unit 104.

By contrast, the second light rays 201 are reflected by the optical modulation element 103 so as to form an angle β1 relative to the normal of the surface of the optical modulation element 103. Then, the second light rays 201 are incident on the boundary surface B at an angle (incident angle) of β2, and refracted by the optical element 102R at an angle (refraction angle) of β3, proceeding within the optical element 102R.

Subsequently, the second light rays 201 reach the boundary surface A at an angle of β4 less than θc (β4<θc), and exit the optical element 102R at an angle (refraction angle) of β5 to the external environment.

The light is reflected as reflected light 251 by the surface of the second optical element 105 at a reflection angle of γ1. Subsequently, the reflected light 251 is incident on the boundary B at an incident angle of γ2, and travels through the optical element 102R at a refraction angle of γ3. The reflected light 251 reaches the boundary surface A at an angle of γ4 less than θc (γ4<θc), and passes through the boundary surface A to exit the optical element 102R to the external environment at a refraction angle of γ5.

Assuming that the refractive index n1 of the external environment is 1.00, the refractive index n2 of the optical element 102 is 1.59, and the adjustment angle on one side of the optical modulation element 103 is 12 degrees, specific example values of various parameters are as follows.

θc=38.9 {=arcsin(1.00/1.59)}
θ1=46.0
θ2=26.9
θ3=3.1 {<θc}
θ4=5.0
θ5=5.0
α1=29.0
α2=29.0
α3=17.7
α4=47.7 {≥θc}
α5=12.3
α6=19.8
β1=19.0
β2=19.0
β3=11.8
β4=18.2 {<θc}
β5=29.8
γ1=5.0
γ2=5.0
γ3=3.1
γ4=33.1 {<θc}
γ5=60.4

If the incident angle relative to the boundary surface A is the same as the above-described value, and the conditions for the transmission through and the total reflection on the boundary surface A are satisfied, any other unwanted light such as light reflected or scattered by a surface of other element other than the second optical element 105 is eliminated.

With the above-described configuration, the first light rays 200 as needed light is clearly separated from the reflected light 251 and the second light rays 201 as unwanted light, with respect to the boundary surface A of the optical element 102R. Thus, the reflected light 251 and the second light rays 201 are kept away from the first light rays 200.

Accordingly, even with the projection unit 104 closer to the optical element 102R, the unwanted light is substantially prevented from entering the projection unit 104. Thus, it is possible to dispose the projection unit 104 closer to the optical element 102R. This arrangement provides a compact optical system 100, and facilitates an increase in magnification power and the angle of view on the projection target.

Further, the light rays of the light 250 incident on the optical modulation element 103 and the reflected light 251 travel between the first light rays 200 emitted from the optical modulation element 103 and the second light rays 201 emitted from the optical modulation element 103. This configuration can provide a compact structure of optical paths and reduce the size of the compact optical element 102R.

By making the same optical element 102R shared between the incident side and the exit side of the optical modulation element 103, a compact optical system 100 is provided.

Further, the boundary surface A of the optical element 102R reflects the first light rays 200 and transmits the second light rays 201, the emitted light 250, and the reflected light 251, that is, the reflection and transmission of light occur on the same boundary surface. Accordingly, the second light rays 201, the reflected light 251, and the emitted light 250 travel at the same side relative to the first light rays 200. This configuration provides a compact optical element 102R and a compact optical system 100.

In the optical system 100 according to the present embodiment, the light emitted from the light source 101 may be directed into the optical modulation element 103 without passing through the optical elements 102 and 102R. In this case, the optical modulation element 103 may be a transmission optical modulation element capable of transmitting the incident light so as to emit the transmitted light in the first direction and the second direction different from the first direction.

Further, the light source 101 in the present embodiment is not limited to the LD and the LED, and any other light emitting element such as an organic EL element may be used.

Figure 21:
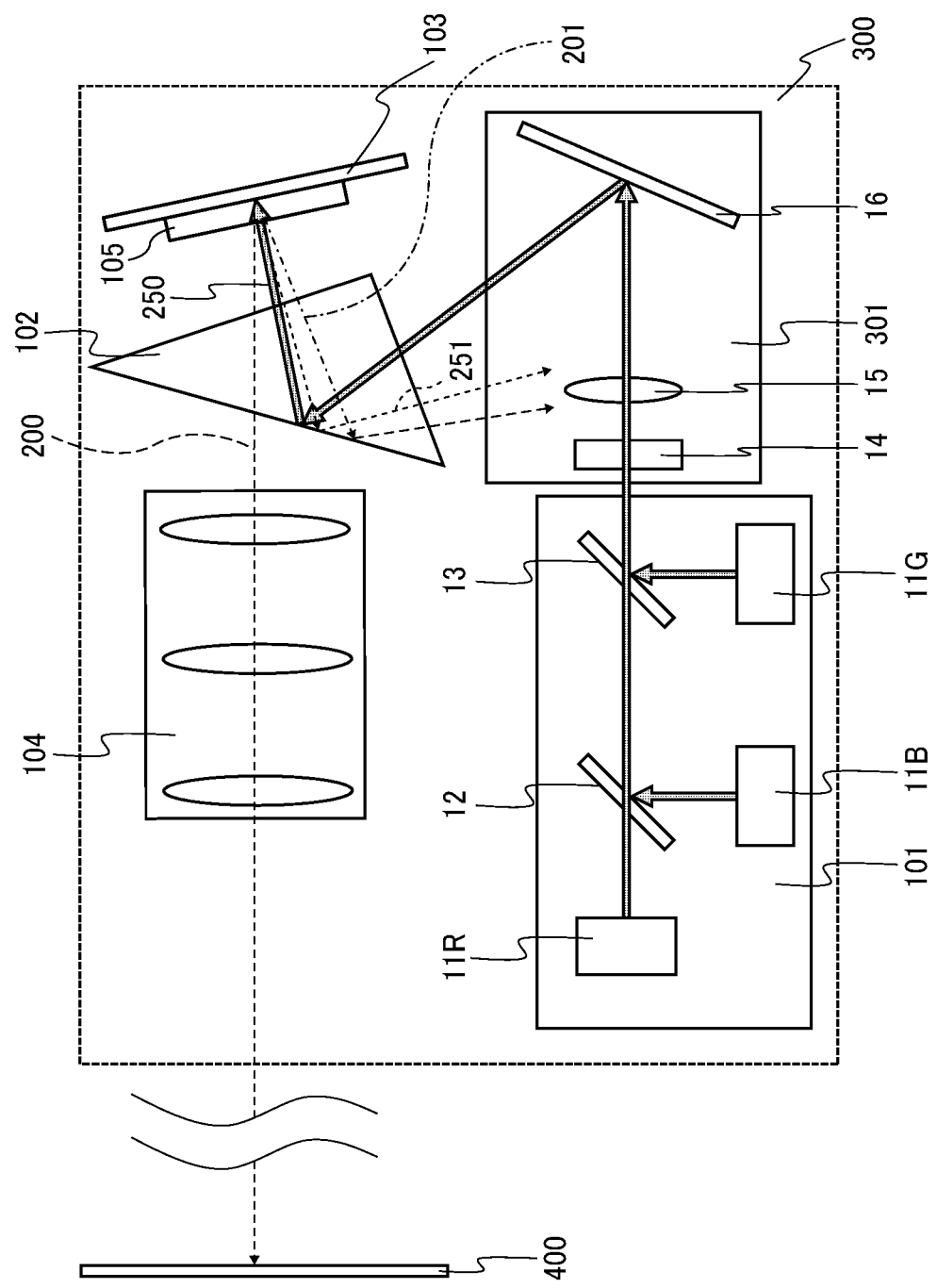
FIG. 21 is a cross-sectional view of an image projection apparatus according to a variation of the embodiment in FIG. 12.

FIG. 21 is a cross-sectional view of an image projection apparatus 300 according to a variation of the embodiment illustrated in FIG. 12.

The image projection apparatus 300 includes a second optical element 105 in addition to the configuration in FIG. 12. The second optical element 105 is configured in the same manner as in the second optical element 105 of the optical system 100 described with reference to FIGS. 13 to 20.

With the above-described configuration, the first light rays 200 as ON light for forming an image is clearly separated from the second light rays 201 and the reflected light 251 as OFF light not for forming an image, with respect to the boundary surface B of the optical element 102. Thus, the second light rays 201 and the reflected light 251 are kept away from the first light rays 200.

Accordingly, the second light rays 201 and the reflected light 251 can be substantially prevented from entering the projection unit 104. This configuration can increase the difference in the luminance of the screen 400 between the mode to emit the first light rays 200 from the optical modulation element 103 and another mode to emit the second light rays 201 from the optical modulation element 103. Therefore, the quality of the image projected onto the screen 400 can be enhanced.

Accordingly, even with the projection unit 104 closer to the optical element 102, the unwanted light is substantially prevented from entering the projection unit 104. Thus, it is possible to dispose the projection unit 104 closer to the optical element 102. This arrangement provides a compact optical system 100, and facilitates an increase in magnification power and the angle of view on the projection target.

Further, the light rays of the light 250 incident on the optical modulation element 103 and the reflected light 251 travel between the first light rays 200 emitted from the optical modulation element 103 and the second light rays 201 emitted from the optical modulation element 103. This configuration can provide a compact structure of optical paths and reduce the size of the compact optical element 102.

Further, the following configurations provide a compact optical system 100: the same optical element 102 is shared between the incident side and the exit side of the optical modulation element 103; and the light 250 emitted from the light source 101, the reflected light 251, and the second light rays 201 are reflected by the same boundary surface B of the optical element 102.

Further, the boundary surface B transmits the first light rays 200 and reflects the second light rays 201, the emitted light 250, and the reflected light 251, that is, the reflection and transmission of light occur on the same boundary surface. Accordingly, the second light rays 201, the reflected light 251, and the emitted light 250 travel at the same side relative to the first light rays 200. This configuration provides a compact optical element 102 and a compact optical system 100.

Figure 22:
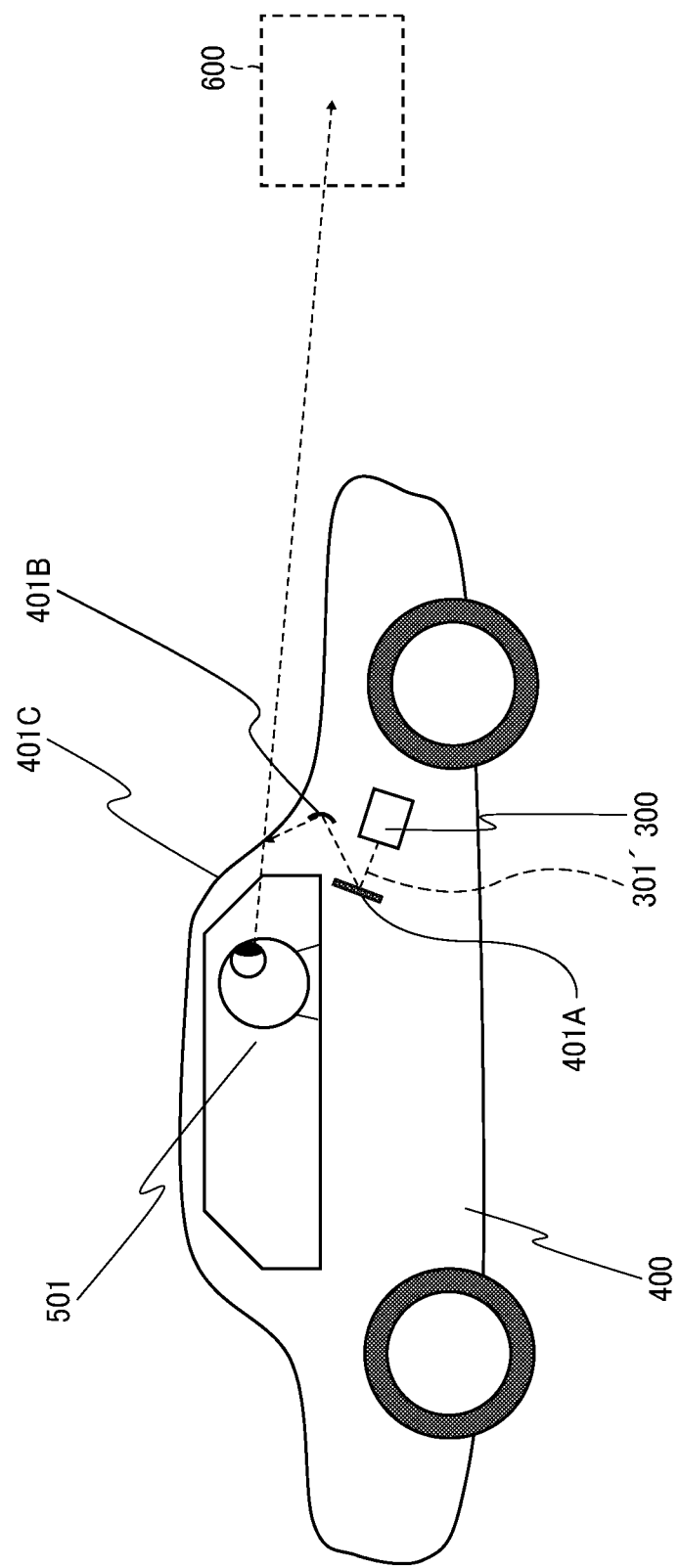
FIG. 22 is a diagram of a vehicle on which an image projection apparatus according to an embodiment is mountable.

FIG. 22 is a diagram of a mobile object 400 on which the image projection apparatus 300 according to an embodiment is mountable.

A vehicle (mobile object) 400 includes an image projection apparatus 300 that projects an image, and optical components 401A, 401B, and 401C (windshields) that reflect an image 301' formed by the image projection apparatus 300. With this vehicle 400, a driver 501 can recognize the virtual image 600 several meters ahead. The image projection apparatus 300 is configured same as the image projection apparatus 300 described with reference to FIGS. 12 and 21.

With the above-described configuration, the first light rays 200 as ON light for forming an image is clearly separated from the second light rays 201 and the reflected light 251 as OFF light not for forming an image. Thus, the second light rays 201 and the reflected light 251 are kept away from the first light rays 200. Accordingly, the second light rays 201 and the reflected light 251 can be substantially prevented from entering the projection unit 104. This configuration can increase the difference in the luminance of the virtual image 600 between the mode to emit the first light rays 200 from the optical modulation element 103 and another mode to emit the second light rays 201 from the optical modulation element 103. Thus, the image quality of the virtual image 600 can also be improved.

Accordingly, even with the projection unit 104 closer to the optical element 102, the unwanted light is substantially prevented from entering the projection unit 104. Thus, it is possible to dispose the projection unit 104 closer to the optical element 102. This arrangement provides a compact optical system 100, and facilitates an increase in magnifications power and the angle of view on the projection target.

Further, the light rays of the light 250 incident on the optical modulation element 103 and the reflected light 251 travel between the first light rays 200 emitted from the optical modulation element 103 and the second light rays 201 emitted from the optical modulation element 103. This configuration can provide a compact structure of optical paths and reduce the size of the compact optical element 102.

As described above, the optical system 100 according to an embodiment of the present disclosure includes the optical modulation element 103 that emits the incident light 250 in the first direction or the second direction different from the first direction; and the optical elements 102 and 102R each to emit light 250 emitted from the light source 101 to the optical modulation element 103 so that the light 250 strikes on the optical modulation element 103 as the incident light 250. The optical element 102 and 102R have a boundary surface (interface) that transmits one and reflects the other of the first light rays 200 emitted from the optical modulation element 103 in the first direction to the projection target; and the second light rays 201 emitted in the second direction from the optical modulation element 103 and the emitted light 250.

In other words, the optical element 102 has the boundary surface (interface) B that transmits the first light rays 200, and reflects the second light rays 201 and the emitted light 250. Alternatively, the optical element 102R has the boundary surface (interface) A that reflects the first light rays 200 and transmits the second light rays 201 and the emitted light 250.

With such a configuration, the second light rays 201 are kept away from the first light rays 200, thus substantially eliminating the adverse effect of the second light rays 201 on the projection target. Further, since the reflection and transmission of light occur on the same boundary surface of the optical elements 102 and 102R, the second light rays 201 and the emitted light 250 travel at the same side relative to the first light rays 200. This configuration provides a compact optical elements 102 and 102R and a compact optical system 100.

This configuration provides a compact optical system 100 and can increase the difference in the luminance of the projection target between the mode to emit the first light rays 200 from the optical modulation element 103 and another mode to emit the second light rays 201 from the optical modulation element 103.

Accordingly, even with the projection target closer to the optical elements 102 and 102R, the unwanted light is substantially prevented from striking on the projection target. Thus, it is possible to dispose the projection target closer to the optical elements 102 and 102R. This arrangement provides a compact optical system 100, and facilitates an increase in magnification power and the angle of view on the projection target.

Further, the optical system 100 according to an embodiment of the present disclosure includes the optical modulation element 103 that emits the incident light 250 in the first direction or the second direction different from the first direction; and the optical elements 102 and 102R that transmit one and the other of the first light rays 200 emitted from the optical modulation element 103 in the first direction to the projection target and the second light rays 201 emitted in the second direction from the optical modulation element 103. The second light rays 201 emitted from the optical modulation element 103 travel on the opposite side of the first light rays 200 emitted from the optical modulation element 103 across the light rays of the emitted light 250.

Specifically, at the boundary surface B of the optical element 102 or the boundary surface A of the optical element 102R, the second light rays 201 travel on the opposite side of the first light rays 200 across the incident light 250.

With such a configuration, the second light rays 201 are kept away from the first light rays 200, thus substantially eliminating the adverse effect of the second light rays 201. This configuration can increase the difference in the luminance of the projection target between the mode to emit the first light rays 200 from the optical modulation element 103, and another mode to emit the second light rays 201 from the optical modulation element 103.

Further, the light rays of the light 250 incident on the optical modulation element 103 travel between the first light rays 200 emitted from the optical modulation element 103 and the second light rays 201 emitted from the optical modulation element 103. This configuration can provide a compact structure of optical paths.

Further, the optical system 100 according to an embodiment of the present disclosure includes the optical modulation element 103 that emits the incident light 250 in the first direction or the second direction different from the first direction; the optical elements 102 and 102R, and the optical element 105 disposed between the optical elements 102 and 102R, and the optical modulation element 103. The optical elements 102 and 102R emit the light 250 emitted from the light source 101 to the optical modulation element 103. The optical elements 102 and 102R transmit one and reflect the other of the first light rays 200 emitted from the optical modulation element 103 in the first direction and the reflected light 251 reflected by the second optical element 105 without being transmitted therethrough.

With such a configuration, the reflected light 251 is kept away from the first light rays 200, thus substantially eliminating the adverse effect of the reflected light 251 on the projection target.

The optical elements 102 and 102R transmit one and reflect the other of the first light rays 200; and the second light rays 201 emitted in the second direction from the optical modulation element 103 and the reflected light 251. With such a configuration, the second light rays 201 and the reflected light 251 are reliably kept away from the first light rays 200, thus substantially eliminating the adverse effect of the second light rays 201 and the reflected light 251 on the projection target.

In other words, the optical element 102 has the boundary surface (interface) B that transmits the first light rays 200, and reflects the second light rays 201 and the reflected light 251. Alternatively, the optical element 102R has the boundary surface A that reflects the first light rays 200 and transmits the second light rays 201 and the reflected light 251.

As described above, by allowing the reflection and transmission of light to occur at the same boundary surface of the optical elements 102 and 102R, the second light rays 201 and the emitted light 250 can travel at the same side relative to the first light rays 200. This configuration provides a compact optical elements 102 and 102R and a compact optical system 100.

The optical elements 102 and 102R transmit one and reflect the other of the first light rays 200; and the emitted light 250 and the reflected light 251.

In other words, the optical element 102 has the boundary surface B that transmits the first light rays 200, and reflects the emitted light 250 and the reflected light 251. Alternatively, the optical element 102R has the boundary surface A that reflects the first light rays 200 and transmits the emitted light 250 and the reflected light 251.

As described above, by allowing the reflection and transmission of light to occur at the same boundary surface of the optical elements 102 and 102R, the emitted light 250 and the reflected light 251 can travel at the same side relative to the first light rays 200. This configuration provides a compact optical elements 102 and 102R and a compact optical system 100.

Through the boundary surface B of the optical element 102 and the boundary surface A of the optical element 102R, the second light rays 201 emitted from the optical modulation element 103 travel on the opposite side of the first light rays 200 emitted from the optical modulation element 103 across the incidence light 250 and the reflected light 251.

With such a configuration, the second light rays 201 are kept away from the first light rays 200, thus substantially eliminating the adverse effect of the second light rays 201. This configuration can increase the difference in the luminance of the projection target between the mode to emit the first light rays 200 from the optical modulation element 103 and another mode to emit the second light rays 201 from the optical modulation element 103.

Each of the first light rays 200 and the reflected light 251 includes the principal light ray, the upper light ray, and the lower light ray, each of the upper light ray and the lower light ray forming an angle relative to the principal light ray. The angle formed by the principal light ray and one of the upper light ray and the lower light ray of each of the first light rays 200 and the reflected light 251 is less than or equal to half of the angle formed by the extension of the principal light ray of the first light rays 200 and the extension of the principal light ray of the reflected light 251.

Accordingly, needed light and unwanted light can be extracted without being mixed together even when the optical system 100 includes the reflected light 251, which is under the strictest conditions.

The optical modulation element 103 reflects the incident light 250 in the first direction or in the second direction. Accordingly, the incident light 250, the first light rays 200, and the second light rays 201 travel on the surface side of the optical modulation element 103. This configuration provides a compact optical system 100.

The optical modulation element 103 is a DMD. This configuration can easily increase the difference in the luminance of the projection target between when the first light rays 200 are emitted from the optical modulation element 103 and when the second light rays 201 are emitted from the optical modulation element 103.

The optical modulation element 103 has the variable area 103A and the fixed area 103B. The variable area 103A is to emit the light 250 incident thereon in the first direction or in the second direction. The fixed area 103B is to emit the incident light 250 in a fixed direction, i.e., the second direction.

Accordingly, the light emitted from the fixed area 103B is only light parallel to the second light rays 201, and does not include any light parallel to the first light rays 200. That is, any light emitted from the fixed area 103B is not directed to the projection unit 104. Accordingly, the light from the fixed area 103B is not projected to the projection target while the second light rays 201 are emitted as unwanted light from the variable area 103A. This configuration can increase the difference in the luminance of the projection target between the mode to emit the first light rays 200 from the optical modulation element 103 and another mode to emit the second light rays 201 from the optical modulation element 103.

The optical elements 102 and 102R are prisms. This configuration provides a simple structure and can increase the difference in the luminance of the projection target between the mode to emit the first light rays 200 from the optical modulation element 103 and another mode to emit the second light rays 201 from the optical modulation element 103.

The optical system 100 includes a projection optical system as the projection unit 104 that receives the first light rays 200 transmitted through the optical elements 102 and 102R, and project the first light rays 200 onto the projection target.

With such a configuration, the second light rays 201 are kept away from the first light rays 200, thus substantially preventing the second light rays 201 (and the reflected light 251) from entering the projection unit 104. This configuration can increase the difference in the luminance of the projection target between the mode to emit the first light rays 200 from the optical modulation element 103 and another mode to emit the second light rays 201 from the optical modulation element 103.

Accordingly, even with the projection unit 104 closer to the optical element 102, the unwanted light is substantially prevented from entering the projection unit 104. Thus, it is possible to dispose the projection unit 104 closer to the optical elements 102 and 102R. This arrangement provides a compact optical system 100, and facilitates an increase in magnification power and the angle of view on the projection target.

An image projection apparatus 300 according to an embodiment of the present disclosure includes the optical system 100 of the above-described configurations, and a mobile object according to an embodiment of the present disclosure includes the image projection apparatus 300 of the above-described configurations.

With this configuration, the first light rays 200 as ON light for forming an image is clearly separated from the second light rays 201 (and the reflected light 251) as OFF light not for forming an image. Thus, the second light rays 201 are kept away from the first light rays 200. This configuration can substantially eliminate the adverse effect of the second light rays 201 (and the reflected light 251) on the projection target, and increase the difference in the luminance of the projection target between the mode to emit the first light rays 200 from the optical modulation element 103 and another mode to emit the second light rays 201 from the optical modulation element 103. Thus, the image quality of a projected image can also be improved.

Further, the light rays of the light 250 incident on the optical modulation element 103 (and the reflected light 251) travel between the first light rays 200 emitted from the optical modulation element 103 and the second light rays 201 emitted from the optical modulation element 103. This configuration can provide a compact structure of optical paths.

Further, the boundary surface B of the optical element 102 or the boundary surface A of the optical element 102R transmits one and reflects the other of the first light rays 200; and the emitted light 250 and the second light rays 201 (and the reflected light 251). Accordingly, by allowing the reflection and transmission of light to occur at the same boundary surface, the emitted light 250, the second light rays 201, (and the reflected light 251) can travel at the same side relative to the first light rays 200. This configuration provides a compact optical elements 102 and 102R and a compact optical system 100.

Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An optical system, comprising:
  a first optical element that emits light emitted from a light source;
  a second optical element; and
  an optical modulation element that receives the light from the first optical element and emits first light rays in a first direction and second light rays in a second direction different from the first direction, wherein
  the first optical element is disposed between the second optical element and the optical modulation element,
  the first optical element includes an interface that transmits one and reflects the other of:
    the first light rays to be directed to a projection target; and
    the second light rays and the light emitted from the light source, the second light rays to be directed away from the projection target,
  the second optical element receives the first light rays,
  the second light rays are not transmitted through the second optical element,
  each of the first light rays and light reflected by the second optical element includes a principal light ray, an upper light ray, and a lower light ray, one of the upper light ray and the lower light ray forming an angle relative to the principal light ray of each of the first light rays and the light rays reflected by the second optical element, and the angle is less than or equal to half of another angle formed by an extension of the principal light ray of the first light rays and an extension of the principal light ray of the light rays reflected by the second optical element.

2. The optical system according to claim 1, wherein the interface transmits the first light rays and reflects the second light rays and the light emitted from the light source.

3. The optical system according to claim 1, wherein the interface reflects the first light rays and transmits the second light rays and the light emitted from the light source.

4. The optical system according to claim 1, wherein the second light rays emitted from the optical modulation element travel on an opposite side of the first light rays emitted from the optical modulation element across the light received by the optical modulation element.

5. The optical system according to claim 1, wherein through the interface, the second light rays travel on an opposite side of the first light rays across the light received by the optical modulation element.

6. The optical system according to claim 1, wherein the interface transmits light rays reflected by the second optical element.

7. The optical system according to claim 1, wherein the interface reflects light rays reflected by the second optical element.

8. The optical system according to claim 1, wherein through the interface, the second light rays travel on an opposite side of the first light rays across the light received by the optical modulation element and the light rays reflected by the second optical element.

9. The optical system according to claim 1, wherein the optical modulation element reflects the light in one of the first direction and the second direction.

10. The optical system according to claim 1, wherein the optical modulation element is a digital micromirror device.

11. The optical system according to claim 1, wherein the optical modulation element has:

a variable area configured to emit light incident on the variable area in one of the first direction and the second direction; and a fixed area configured to emit light incident on the fixed area in a fixed direction that is the second direction.

12. The optical system according to claim 1, wherein the first optical element is a prism.

13. The optical system according to claim 1, further comprising:

a projection optical system that receives the first light rays passed through the first optical element, and projects the first light rays to the projection target.

14. An image projection apparatus for projecting an image, the image projection apparatus comprising:

the optical system according to claim 1; and the light source.

15. A mobile object comprising the image projection apparatus according to claim 14.

* * * * *